(12) United States Patent
Zhang et al.

(10) Patent No.: US 11,725,091 B2
(45) Date of Patent: Aug. 15, 2023

(54) CELLULOSE FOAMS FOR HIGH PERFORMANCE INSULATIONS

(71) Applicant: Washington State University, Pullman, WA (US)

(72) Inventors: Xiao Zhang, Richland, WA (US); Aboutaleb Ameli, Richland, WA (US); Peipei Wang, Richland, WA (US)

(73) Assignee: Washington State University, Pullman, WA (US)

( * ) Notice: Subject to any disclaimer, the term of this patent is extended or adjusted under 35 U.S.C. 154(b) by 121 days.

(21) Appl. No.: 16/900,464

(22) Filed: Jun. 12, 2020

(65) Prior Publication Data

US 2020/0392301 A1 Dec. 17, 2020

Related U.S. Application Data

(60) Provisional application No. 62/861,936, filed on Jun. 14, 2019.

(51) Int. Cl.
*C08J 9/12* (2006.01)

(52) U.S. Cl.
CPC .......... *C08J 9/125* (2013.01); *C08J 2203/10* (2013.01); *C08J 2301/02* (2013.01)

(58) Field of Classification Search
CPC ........ C08J 9/0023; C08J 9/0061; C08J 9/125; C08J 9/28; C08J 2201/0484; C08J 2203/10; C08J 2300/108; C08J 2301/02; C08J 2429/04

See application file for complete search history.

(56) References Cited

U.S. PATENT DOCUMENTS

| | | | |
|---|---|---|---|
| 9,376,503 B2 * | 6/2016 | Shoseyov | C08J 9/365 |
| 2020/0048537 A1 * | 2/2020 | Refunjol | C09K 8/035 |
| 2022/0106455 A1 * | 4/2022 | Truniger | C08L 1/02 |

* cited by examiner

*Primary Examiner* — John M Cooney
(74) *Attorney, Agent, or Firm* — Christensen O'Connor Johnson Kindness PLLC

(57) ABSTRACT

Environmentally friendly, sustainable, and high-performance ultralight composite foams are disclosed. The composite foams are prepared from cellulose nanomaterial, polymeric material, and a crosslinking agent. The fabrication process is simple and uses only water. The composite foams exhibit an elastic strain exceeding the values reported for known nanocellulose-based foams with no reinforcement. The foams exhibit a thermal conductivity superior to that of traditional insulating materials and retain structural integrity after burning.

19 Claims, 20 Drawing Sheets

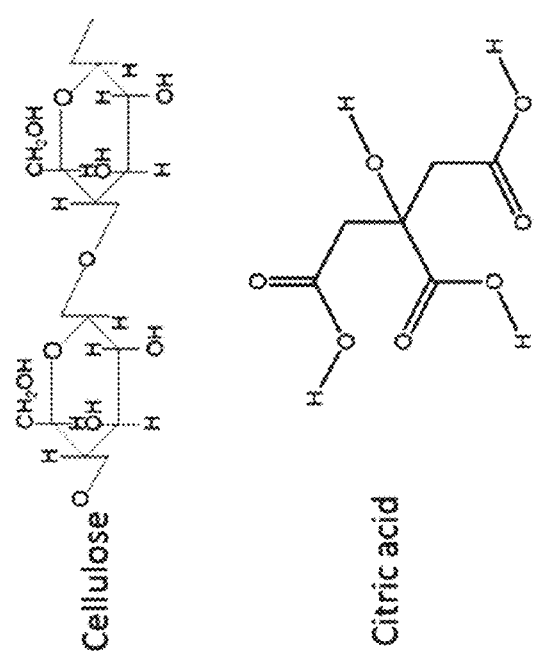
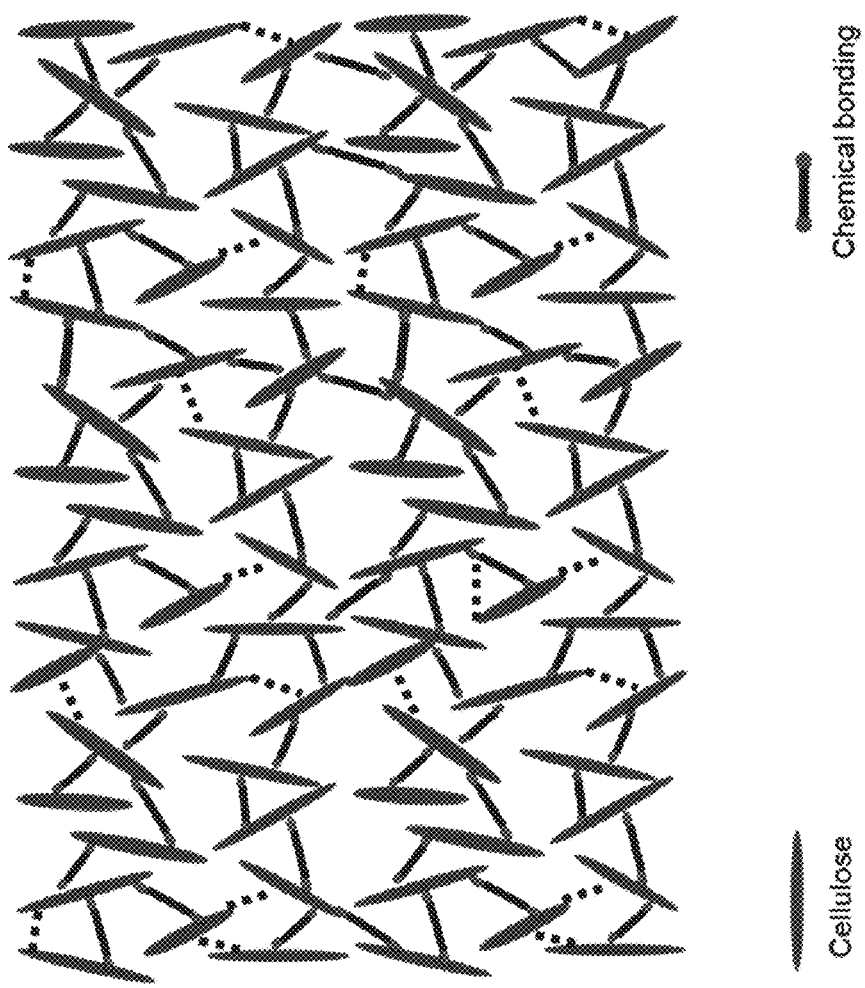
FIG. 4

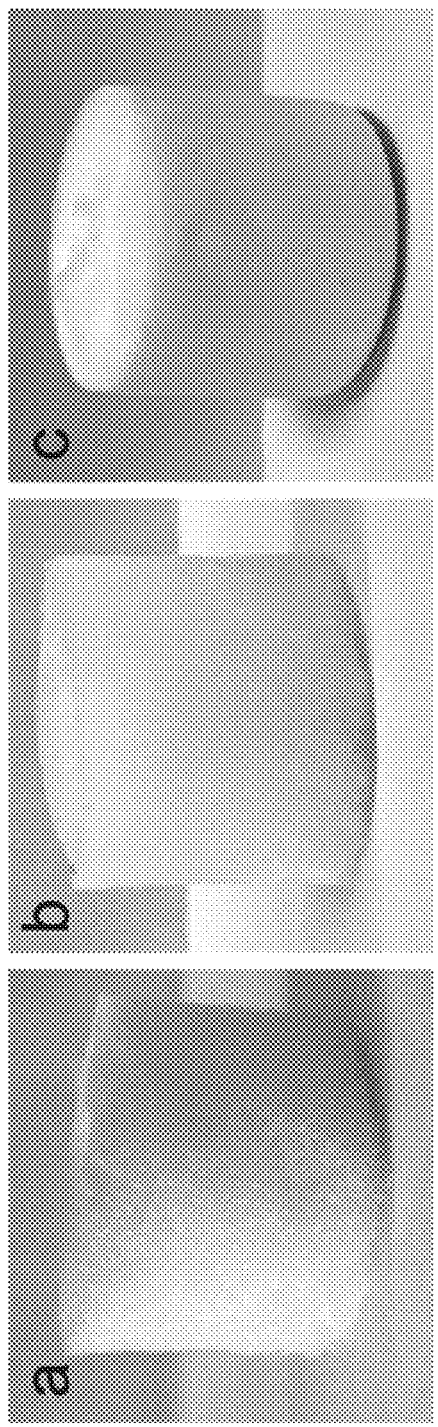
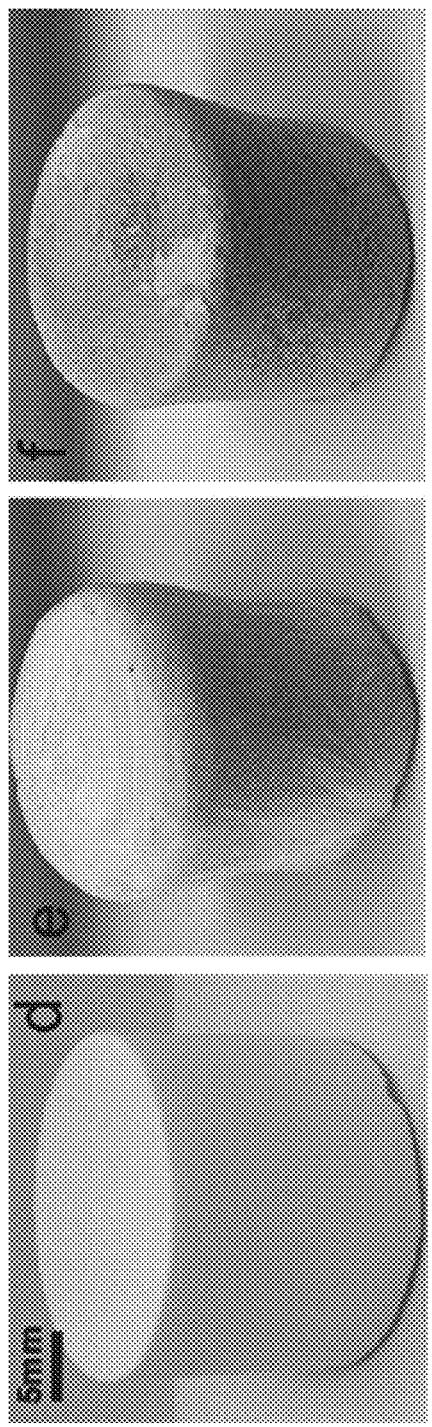
FIG. 11A  FIG. 11B  FIG. 11C  FIG. 11D  FIG. 11E  FIG. 11F

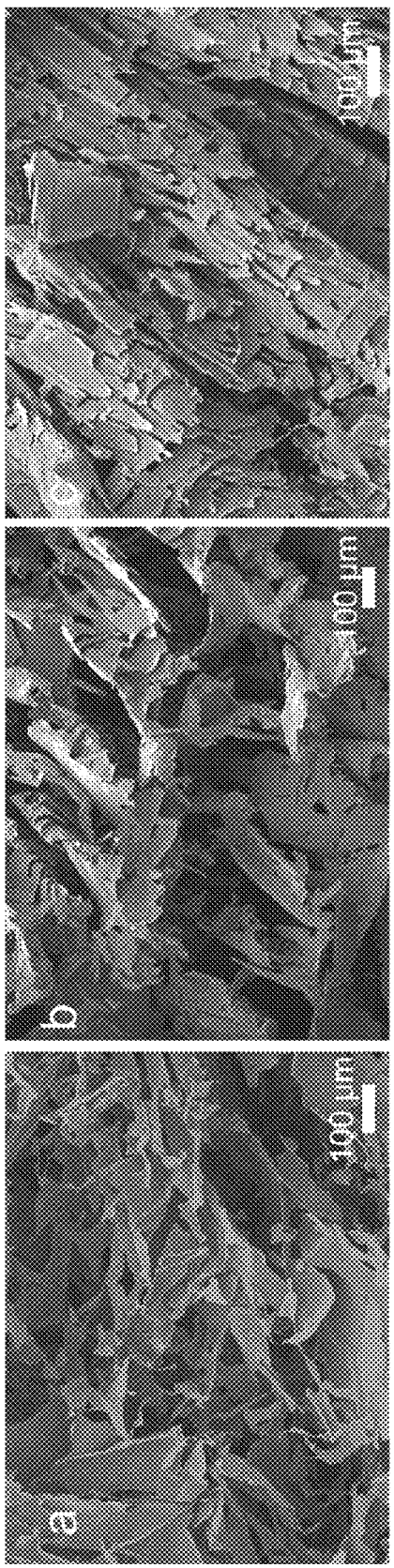
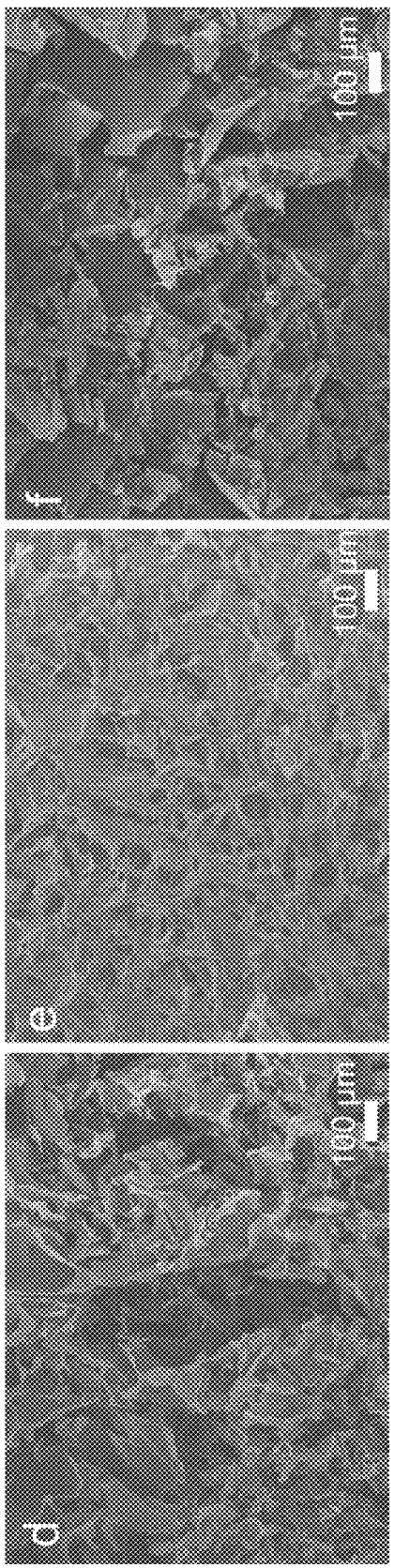
FIG. 12A  FIG. 12B  FIG. 12C  FIG. 12D  FIG. 12E  FIG. 12F

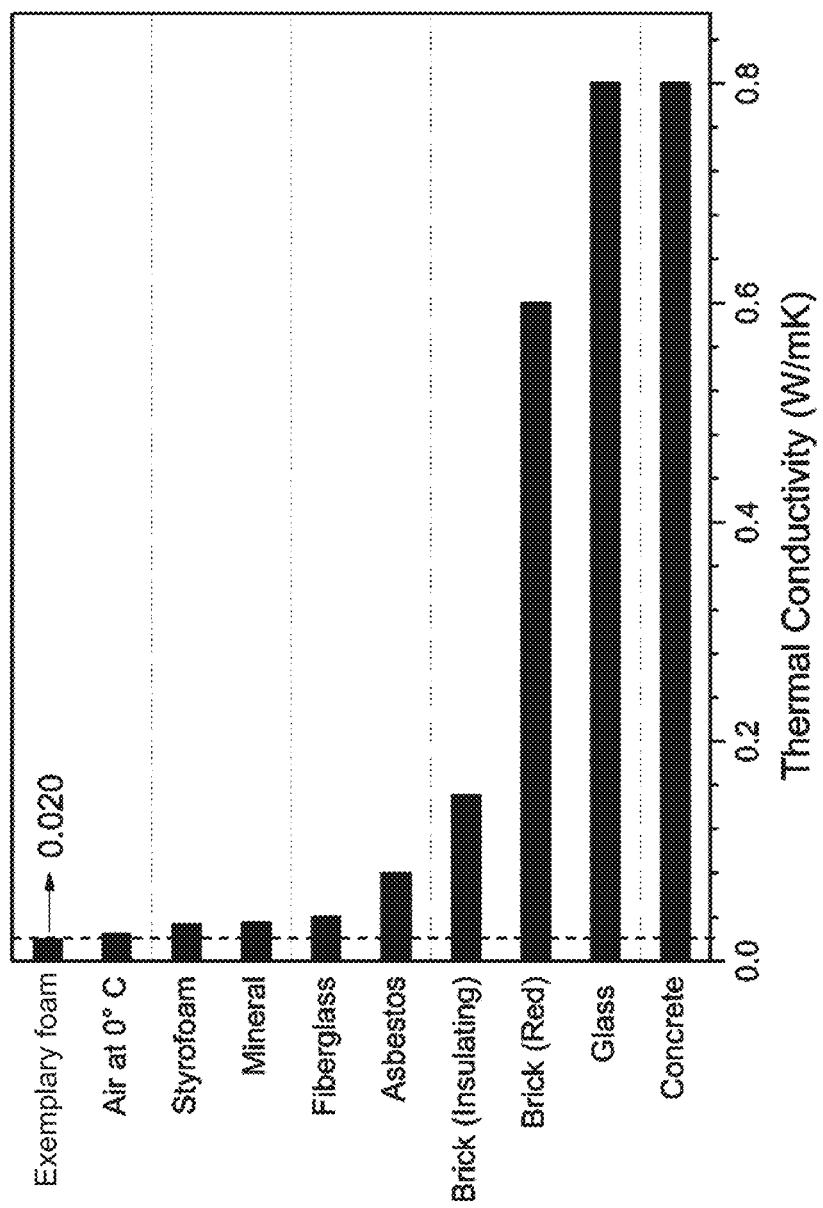

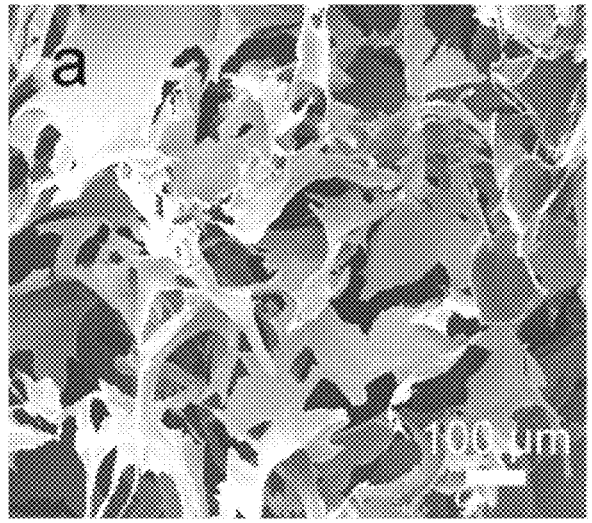 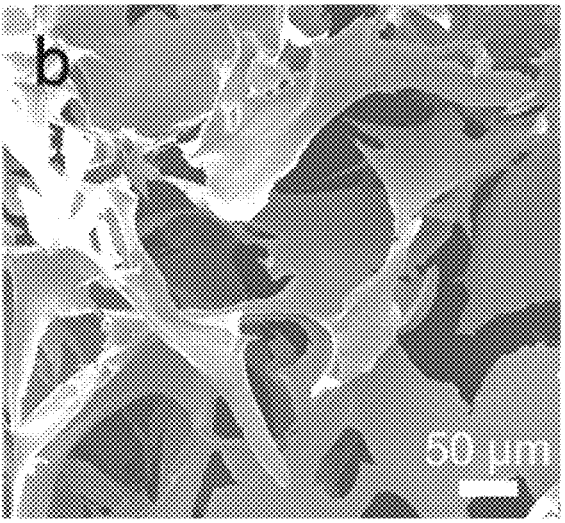
FIG. 18A  FIG. 18B
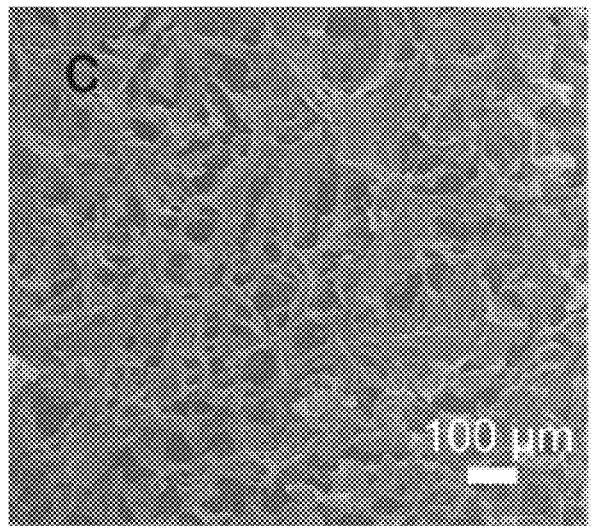 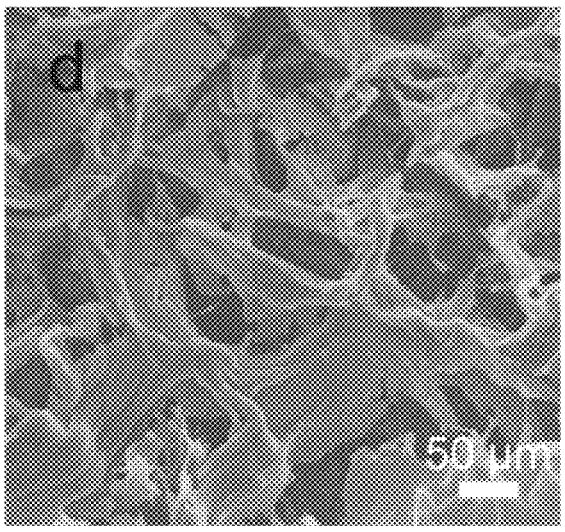
FIG. 18C  FIG. 18D

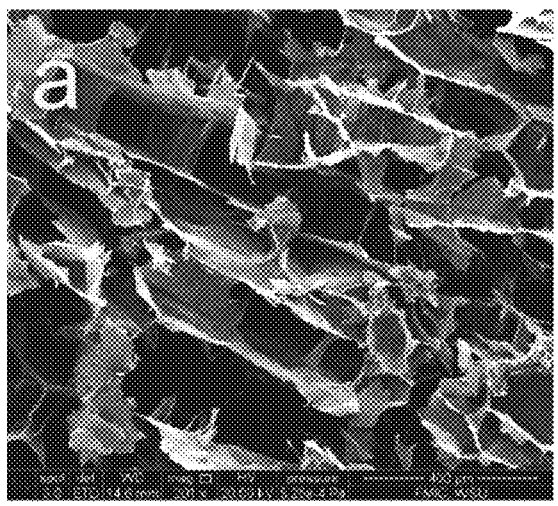 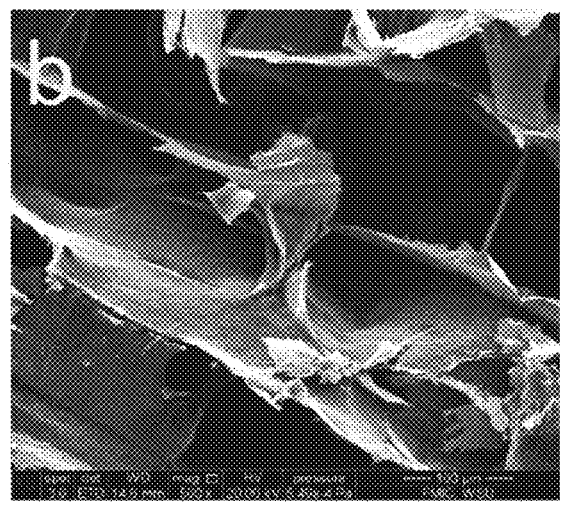
*FIG. 23A*    *FIG. 23B*

CELLULOSE FOAMS FOR HIGH PERFORMANCE INSULATIONS

CROSS-REFERENCE TO RELATED APPLICATION

This application claims the benefit of U.S. Provisional Application No. 62/861,936, filed Jun. 14, 2019; the contents of which are hereby incorporated by reference in their entirety.

BACKGROUND

Energy saving is a big challenge in the world, and any reduction in the energy consumption through daily activities is considered a great progress. Thermally insulative materials play a vital role in energy preservation in buildings and construction, transportation, and packaging industries. Expanded polystyrene has been widely used for commercial lightweight, thermal insulation applications. However, expanded polystyrene is petroleum-based, composed of toxic styrene blocks, and exhibit relatively poor fire resistance with substantial tail ash floating in the air after burning. It therefore poses the risk of environmental contamination and health side effects. In addition, polystyrene does not lend itself to easy degradation and adversely contributes to the landfill issue.

Cellulose is the most abundant organic polymer on earth, having an estimated annual production of $7.5 \times 10^{10}$ tons. Nanocrystalline cellulose (NCC) is usually obtained by acid hydrolysis of cellulose, mainly from plants, such as wood, cotton, and some other natural products such as bacteria and tunicate. NCC exhibits a highly crystalline characteristic and possesses several promising advantages such as nanoscale dimensions, hydroxy reactivity, large surface to volume ratio, relatively low thermal conductivity, high mechanical strength, biocompatibility, and biodegradability. These interesting physicochemical properties push NCC towards a wide range of potential applications and have attracted tremendous attentions from both academia and industry. NCC have been studied and applied as an alternative material for biomedical applications because of its biocompatibility and biodegradability. It has also been examined as a reinforcing additive in several nanocomposites for the fabrication of nanofibers, films, and foams.

Recently, cellulose-based lightweight foams have been the focus of several studies. A cellulose nanofiber (CNF)-based foam with ultralow density and excellent thermal insulating capability using a freeze casting process has been reported. Boric acid was used as a crosslinking agent, and graphene oxide was introduced to enhance the mechanical performance of the foams. The reported foams are highly anisotropic and still weaker than the commercially viable petroleum-based counterparts; they show insignificant load resistance in the radial direction (~2 kPa at 50% stain) and their strength reaches ~22 kPa at 50% strain in the axial direction with minimal elasticity behavior up to only ~5% strain. In addition, they also exhibit a relatively high thermal conductivity in the axial direction (>0.160 $Wm^{-1}K^{-1}$). Moreover, graphene oxide may adversely contribute to the overall thermal insulation behavior, due to its high thermal conductivity. They also showed that the mechanical properties of cellulose-based foams decrease upon exposure to higher temperature and relative humidity. When the exposure condition changes form 23° C./50% RH to 30° C./85% RH, the retained modulus of the foam is about 60% of the initial modulus and it is recovered to ~80% upon drying to 23° C./50% RH condition.

Thus, a need exists for renewable, greener, and cleaner alternative insulation materials that are mechanically robust and exhibit excellent thermal insulation capability achieving thermal conductivity ($\lambda$) values below or similar to those of the currently used commercial insulation materials, such as expanded or extruded polystyrene ($\lambda$=0.030-0.044 $Wm^{-1}K^{-1}$), mineral wood ($\lambda$=0.030-0.040 $Wm^{-1}K^{-1}$), and cork ($\lambda$=0.040-0.050 $Wm^{-1}K^{-1}$).

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the disclosure provides a composite foam, comprising:
about 10 wt % to about 95 wt % of a cellulose component comprising about 20% to about 100% cellulose nanomaterial;
about 1 wt % to about 25 wt % of a polymer comprising a plurality of first crosslinkable groups,
about 1 wt % to about 25 wt % of a crosslinking agent comprising a plurality of second crosslinkable groups;
wherein at least a portion of the second crosslinkable groups forms covalent bonds with at least a portion of the first crosslinkable groups and at least a portion of the hydroxy groups of the cellulose component.

In some embodiments, the composite foam has a porosity of about 30% to about 99%. In some embodiments, wherein the composite foam has an apparent density of about 0.01 $g/cm^3$ to about 1 $g/cm^3$. In some embodiments, the cellulose component comprises 100% cellulose nanomaterial.

In some embodiments, the polymer is water-soluble. In some embodiments, the first crosslinkable group is a hydroxy, a thiol, a hydrazide, an amino group, or a combination thereof. In some embodiments, the first crosslinkable group is a hydroxyl (OH). In some embodiments, the second crosslinkable group is a carboxylic acid, an anhydride, an activated ester, an aldehyde, a ketone, or a combination thereof. In some embodiments, the second crosslinkable group is a carboxylic acid.

In some embodiments, the crosslinking agent is water-soluble. In some embodiments, the water-soluble polymer is polyvinyl alcohol (PVA), polyethylene glycol (PEG), polyacrylic acid (PAA), polyvinyl pyrrolidone (PVP), polyacrylamide (PAM), alginic acid, starch, xanthan gum, dextran, pectin, or a combination thereof. In some embodiments, the water-soluble crosslinking agent is 1,2,3,4-butane tetracarboxylic acid, oxalic acid, succinic acid, malic acid, citric acid, adipic acid, or a combination thereof.

In some embodiments, the composite foam is formed by freeze-casting of a precursor composition that does not comprise an organic solvent.

In some embodiments, the composite foam has a compression stress measured at 50% strain from about 50 kPa to about 250 kPa. In some embodiments, the composite foam has thermal conductivity from about 0.015 $Wm^{-1}K^{-1}$ to about 0.045 $Wm^{-1}K^{-1}$. In some embodiments, the composite foam has an elastic strain of at least 10% at Young's modulus of from 50 kPa to about 1500 kPa.

In some embodiments, the composite foam comprises a colorant. In some embodiments, at least a portion of the cellulose component is silanized. In some embodiments, at least a portion of the hydroxy groups of the cellulose component are silanized.

In another aspect, provided herein is an article of manufacture, such as a building product or a consumer product comprising the composite foam of the disclosure. In some embodiments, the building product is an insulation panel. In some embodiments, the consumer product is a cup, a plate, a shipping container, a cooler, or a potting container.

In another aspect, provided herein is a method of making a composite foam, comprising freeze-casting or freeze-drying an aqueous composition comprising a foam precursor, wherein the foam precursor comprises:

about 10 wt % to about 95 wt % of a cellulose component comprising about 20% to about 100% cellulose nanomaterial;

about 1 wt % to about 25 wt % of a polymer (e.g., a water-soluble polymer) comprising a plurality of first crosslinkable groups, about 1 wt % to about 25 wt % of a crosslinking agent (e.g., a water-soluble crosslinking agent) comprising a plurality of second crosslinkable groups;

wherein at least a portion of the second crosslinkable groups can form covalent bonds with at least a portion of the first crosslinkable groups and at least a portion of the hydroxy groups of the cellulose component.

In some embodiments, the aqueous composition, such as suspension or solution, does not include an organic solvent.

In another aspect, the disclosure provides composite foams prepared by the method of the disclosure.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a schematic illustration of the chemical bond formation between cellulose fiber and an exemplary crosslinking agent (citric acid).

FIGS. 11A-11F are photographs of various composite foams: NCC (11A), NCC/BTCA (11B), NCC/PVA (11C), NCC/PVA/BTCA (11D), NCC/PVA/CA (11E), and wood fiber/PVA/CA (11F); all photos have the same scale bar as shown in FIG. 11D.

FIGS. 12A-12F are SEM images of NCC-based composite foam materials: 5PVA-NCC (12A), 10PVA-NCC (12B), 20PVA-NCC (12C), 10PVA/10BTCA/NCC (12D), 10PVA/25BTCA/NCC (12E), and 20PVA/10BTCA/NCC (12F).

FIG. 14 is a thermal conductivity comparison of commercial insulation materials with an exemplary of 10PVA/25BTCA/NCC foam.

FIGS. 18A-18D are low magnification (18A) and high magnification (18B) SEM micrographs of pure NCC foam and low magnification (18C) and high magnification (18D) SEM micrographs of 2NCC (10PVA/25BTCA/NCC) composite foam.

FIGS. 23A and 23B are SEM images of an exemplary foam (2CNF/PVA/BTCA foam).

DETAILED DESCRIPTION

Figure 1:
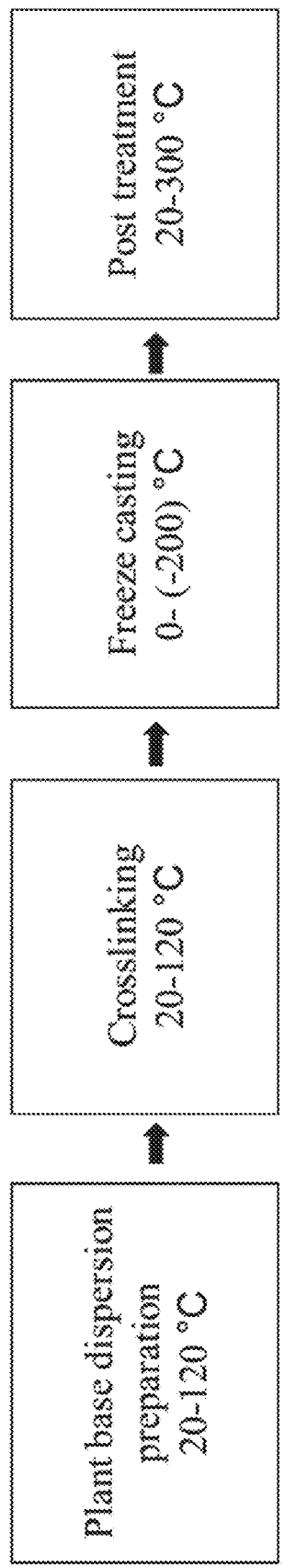
FIG. 1 illustrates preparation of an exemplary foam.

Cellulose nanomaterials are unique materials with high mechanical strength and a number of other attractive physical properties. However, most of these physical properties have only been demonstrated at the nano-whiskers level. It has been difficult to realize these properties in bulk materials. The inventors found that incorporating certain types of crosslinking agents into cellulose nanomaterials under certain conditions surprisingly leads to formation of chemical bonds that in turn create well-organized cellular structures that afford the foam with high mechanical properties while maintaining a high porosity.

Thus, in one aspect, provided herein is a composite foam, comprising a composition formed by combining a cellulose component comprising about 20% to about 100% cellulose nanomaterial, a water-soluble polymer comprising a plurality of first crosslinkable groups, a water-soluble crosslinking agent comprising a plurality of second crosslinkable groups, wherein at least a portion of the second crosslinkable groups forms covalent bonds with at least a portion of the first crosslinkable groups and at least a portion of the hydroxy groups of the cellulose component. In some embodiments, the components of the composite foam are covalently liked.

The composite foams of the disclosure comprise a cellulose component. In some embodiments, the composite foams comprise about 10 wt % to about 95 wt % of the cellulose component. In some embodiments, the composite foams comprise about 20 wt % to about 95 wt % of the cellulose component. In some embodiments, the composite foams comprise about 30 wt % to about 95 wt % of the cellulose component. In some embodiments, the composite foams comprise about 40 wt % to about 95 wt % of the cellulose component. In some embodiments, the composite foams comprise about 60 wt % to about 95 wt % of the cellulose component. In some embodiments, the composite foams comprise about 60 wt % to about 85 wt % of the cellulose component. In some embodiments, the composite foams comprise about 70 wt % to about 85 wt % of the cellulose component. In some embodiments, the composite foams comprise about 60 wt % to about 80 wt % of the cellulose component.

In some embodiments, the cellulose component comprises about 20% to about 100%, about 30% to about 100%, about 40% to about 100%, about 50% to about 100%, about 60% to about 100%, about 70% to about 100%, about 80% to about 100%, or about 90% to about 100% of a cellulose nanomaterial. In some embodiments, the cellulose component comprises 100% cellulose nanomaterial. In some embodiments, the cellulose consists essentially of a cellulose nanomaterial.

As used herein, "cellulose nanomaterials" or "nanocellulose" refer to nano-structured cellulose, including but not limited to nanocrystalline cellulose or cellulose nanocrystals (denoted herein as CNC or NCC, used interchangeably), cellulose nanofibers (CNF), nanofibrillated cellulose (NFC), and nano-structured cellulose produced by bacteria (bacterial nanocellulose). In some embodiments, nanocellulose can be obtained from native cellulose fibers by an acid hydrolysis. In some embodiments, the cellulose nanomaterial is nanocrystalline cellulose (NCC). In addition to cellulose nanomaterials, in some embodiments, other plant-based fibrous materials (e.g. wood-derived nanofibrils) can be included in the cellulose component. In some embodiments, in addition to the cellulose nanomaterial, the cellulose component comprises cellulose that is not nanoscale cellulose. In some embodiments, the cellulose component can include wood pulp. In some embodiments, the cellulose component can comprise cellulose, lignin, hemicellulose, and combinations thereof. In some embodiments, the cellulose component can comprise a carbohydrate, including but not limited to cellulose, starch, xylan, fructan, pectin, hemicellulose, and combinations thereof.

The composite foams of the disclosure further comprise about 1 wt % to about 25 wt % of a water-soluble polymer comprising a plurality of first crosslinkable groups. In some embodiments, the composite foams comprise about 5 wt % to about 25 wt % of a water-soluble polymer. In some embodiments, the composite foams comprise about 5 wt % to about 20 wt % of a water-soluble polymer. In some embodiments, the composite foams comprise about 10 wt % to about 20 wt % of a water-soluble polymer. Any suitable water-soluble polymer can be used in the compositions disclosed herein. Examples of suitable water-soluble polymers include but are not limited to polyvinyl alcohol (PVA), polyethylene glycol (PEG), polyacrylic acid (PAA), polyvinyl pyrrolidone (PVP), polyacrylamide (PAM), alginic acid, starch, xanthan gum, dextran, pectin, or a combination thereof. In some embodiments, the water-soluble polymer is polyvinyl alcohol (PVA).

The water-soluble polymers comprise a plurality of first crosslinkable groups. In some embodiments, the first crosslinkable group is a hydroxy, a thiol, an aldehyde, a ketone, a hydrazide, an amino group, or a combination thereof.

The composite foams of the disclosure further comprise about 1 wt % to about 25 wt % of a water-soluble crosslinking agent comprising a plurality of second crosslinkable groups, wherein the second crosslinkable group is a group capable of forming a covalent bond with the hydroxyl groups (OH) of the cellulose component and with the first crosslinkable group. In some embodiments, the composite foams comprise about 5 wt % to about 25 wt % of a water-soluble crosslinking agent. In some embodiments, the composite foams comprise about 10 wt % to about 25 wt % of a water-soluble crosslinking agent. In some embodiments, the composite foams comprise about 10 wt % to about 20 wt % of a water-soluble crosslinking agent.

In some embodiments, the second crosslinkable group is a carboxylic acid, an anhydride, an activated ester, an aldehyde, a ketone, or a combination thereof. In some embodiments, the second crosslinkable group is a carboxylic acid. In some embodiments, the water-soluble crosslinking agent comprises two or more carboxylic acid groups or activated esters thereof.

Any suitable water-soluble crosslinking agent can be used in the composite foams of the disclosure. In some embodiments, the water-soluble crosslinking agent is a polycarboxylic acid. In some embodiments, the water-soluble crosslinking agent is 1,2,3,4-butane tetracarboxylic acid (BTCA), oxalic acid, succinic acid, malic acid, citric acid, adipic acid, or a combination thereof. In some embodiments, the water-soluble crosslinking agent is 1,2,3,4-butane tetracarboxylic acid (BTCA). In some embodiments, the water-soluble crosslinking agent is citric acid.

Figure 3:
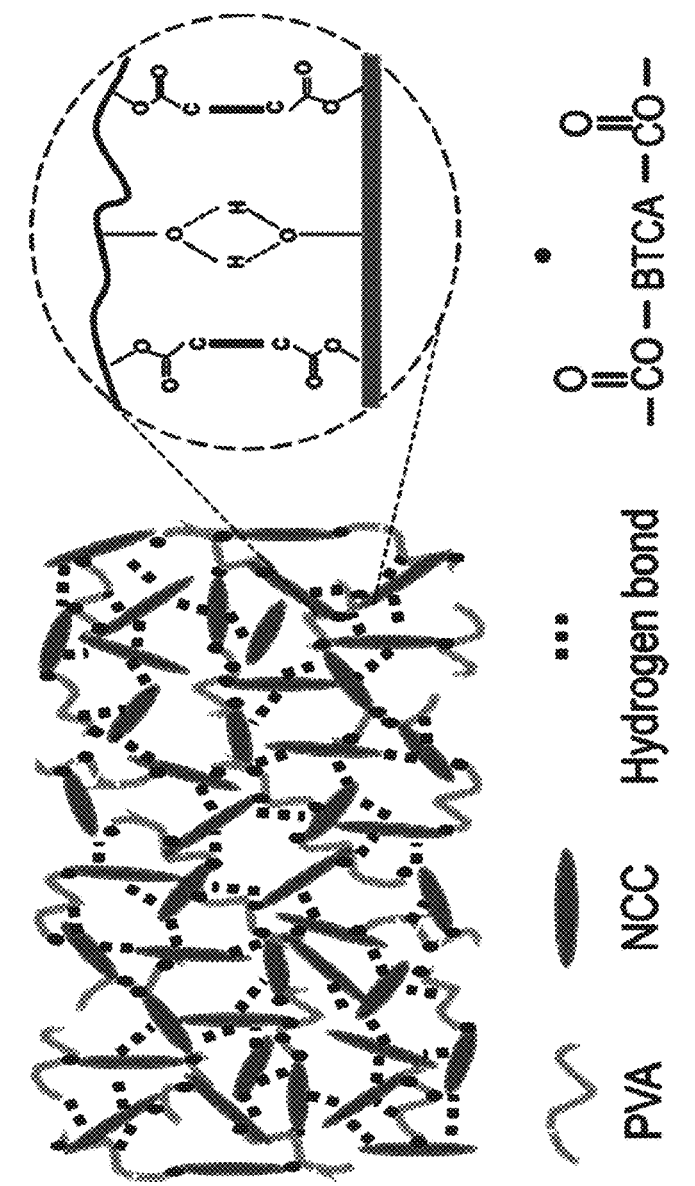
FIG. 3 is a schematic illustration of the ester bonds and hydrogen bonds between the components (NCC, PVA, and BTCA) in an exemplary foam.

Without wishing to be bound by theory, the formation of covalent bonds between an exemplary crosslinking agent and NCC is shown in FIG. 3. As an example, a crosslinking agent, BTCA, contains four carboxyl acid groups and can form ester bond with hydroxyl group (OH). The cellulose component constituents (NCC, cellulose, hemicellulose, lignin, and others) all contain hydroxyl groups and can thus form chemical bonds with such crosslinking agents. Co-polymer(s) possessing hydroxyl group, such as PVA, can also react with such crosslinking agents. The crosslinking agents can form chemical bonds with multiple constituents of the composite foams of the disclosure (e.g., cellulose, hemicellulose, lignin, PVA, etc.). The addition of catalysts (such as $K_2HPO_4$) or activating agents (such as N-(3-dimethylaminopropyl)-N'-ethyl carbodiimide) can be also used to expedite the formation of covalent bonds between the crosslinking agent and the polymer and between the crosslinking agent and the cellulose component. The formation of covalent bonds between the components can provide the structure integrity of the composite foams. In some embodiments, crosslinking creates a well-organized cellular structure that affords the composite foam with high porosity and high strength.

The composite foams of the disclosure are highly porous. In some embodiments, the composite foam has a porosity of about 30% to about 99%. In some embodiments, the composite foam has a porosity of about 40% to about 99%. In some embodiments, the composite foam has a porosity of about 50% to about 99%. In some embodiments, the composite foam has a porosity of about 60% to about 99%. In some embodiments, the composite foam has a porosity of about 70% to about 99%. In some embodiments, the composite foam has a porosity of about 80% to about 99%. In some embodiments, the composite foam has a porosity of about 90% to about 99%. In some embodiments, the composite foams have a well-organized structure with pores that are inter-connected through solid and consistent cell walls. In some embodiments, the composite foams have pores with an average pore size of about 50 μm to about 100 μm as determined by SEM micrographs, The composite foams of the disclosure are lightweight. In some embodiments, the composite foam has a density of about 0.01 g/cm$^3$ to about 1 g/cm$^3$. In some embodiments, the composite foam has a density of about 0.01 g/cm$^3$ to about 0.5 g/cm$^3$. In some embodiments, the composite foam has a density of about 0.01 g/cm$^3$ to about 0.25 g/cm$^3$. In some embodiments, the composite foam has a density of about 0.01 g/cm$^3$ to about 0.08 g/cm$^3$. In some embodiments, the composite foam has a density comparable or equal to the density of Styrofoam.

The composite foams of the disclosure exhibit high mechanical properties. In some embodiments, the composite foam has a compression stress measured at 50% strain from about 5 kPa to about 400 kPa. In some embodiments, the composite foam has a compression stress measured at 50% strain from about 50 kPa to about 300 kPa. In some embodiments, the composite foam has a compression stress measured at 50% strain from about 50 kPa to about 250 kPa. In some embodiments, the composite foam has a compression stress measured at 50% strain from about 100 kPa to about 400 kPa. In some embodiments, the composite foam has an elastic strain of at least 10% at Young's modulus of from 50 kPa to about 1500 kPa. In some embodiments, the composite foam has an elastic strain of at least 10% at Young's modulus of from 100 kPa to about 1300 kPa. In some embodiments, the composite foam has an elastic strain of at least 10% at Young's modulus of from 500 kPa to about 1300 kPa. In some embodiments, the composite foams of the disclosure have mechanical properties comparable to or equal to those of Styrofoam.

The composite foams of the disclosure exhibit low thermal conductivity and thus can be used for thermal insulation. In some embodiments, the composite foam has thermal conductivity from about 0.015 Wm$^{-1}$K$^{-1}$ to about 0.045 Wm$^{-1}$K$^{-1}$. In some embodiments, the composite foam has thermal conductivity from about 0.020 Wm$^{-1}$K$^{-1}$ to about 0.045 Wm$^{-1}$K$^{-1}$. In some embodiments, the composite foam has thermal conductivity from about 0.020 Wm$^{-1}$K$^{-1}$ to about 0.035 Wm$^{-1}$K$^{-1}$. In some embodiments, the composite foams have a thermal conductivity below the range for common commercially available insulation materials, such as expanded polystyrene ($\lambda$=0.030-0.040 Wm$^{-1}$K$^{-1}$), mineral wool ($\lambda$=0.030-0.040 Wm$^{-1}$K$^{-1}$, and extruded polystyrene, $\lambda$=0.033-0.044 Wm$^{-1}$K$^{-1}$).

In some embodiments, colorants, such as inorganic compounds or organic dyes, can be added to the composite foams. Suitable colorants include metal oxides and any dye that can be used as a colorant for cellulose, including but not limited to fiber-reactive dyes, direct dyes, and vat dyes. In some embodiments, the colorant is a fiber-reactive dye that can form covalent bonds with cellulose, for example, dichlorotriazine, monochlorotriazine, aminochlorotriazine dye. Direct dyes include water soluble salts of azo and polyazo compounds. Vat dues include indigo dyes and synthetically made equivalents.

Figure 13:
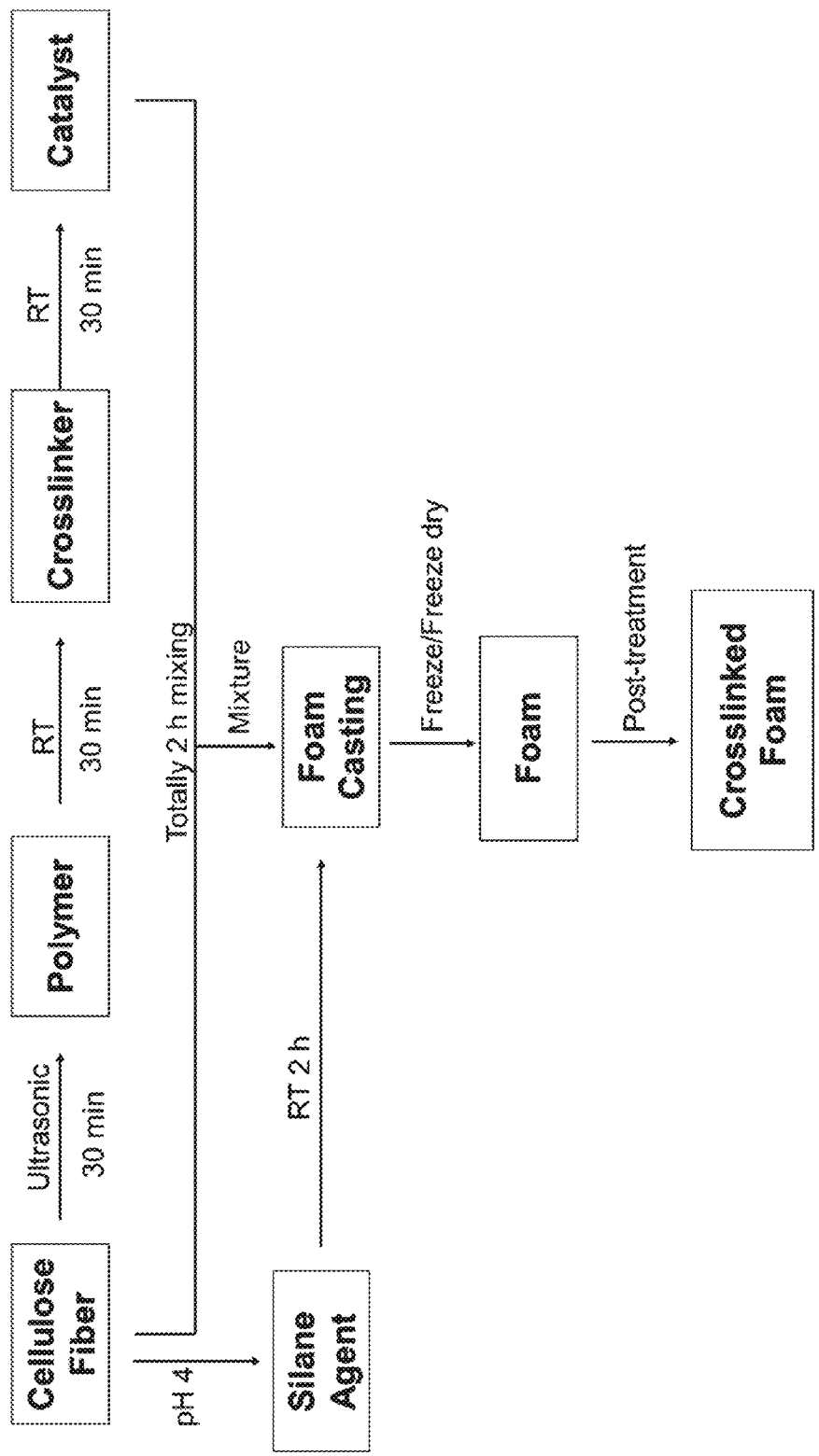
FIG. 13 is an illustration of foam preparation process involving a hydrophobization step.
Figure 15B:
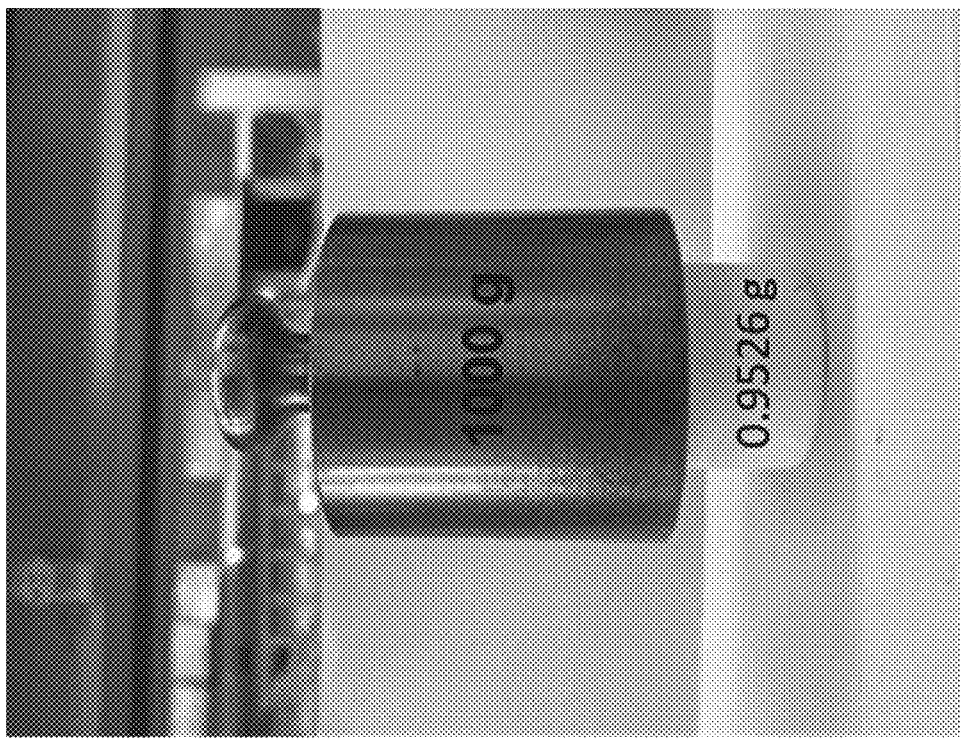
FIGS. 15A and 15B demonstrate that an exemplary foam exhibits light weight and good mechanical properties.
Figure 15A:
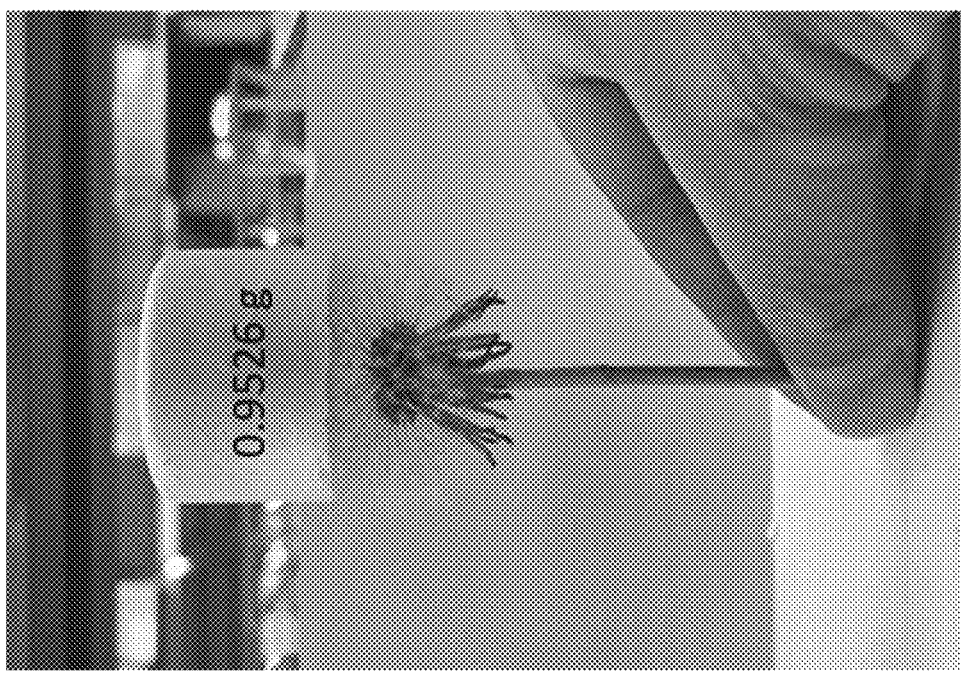
Figure 16:
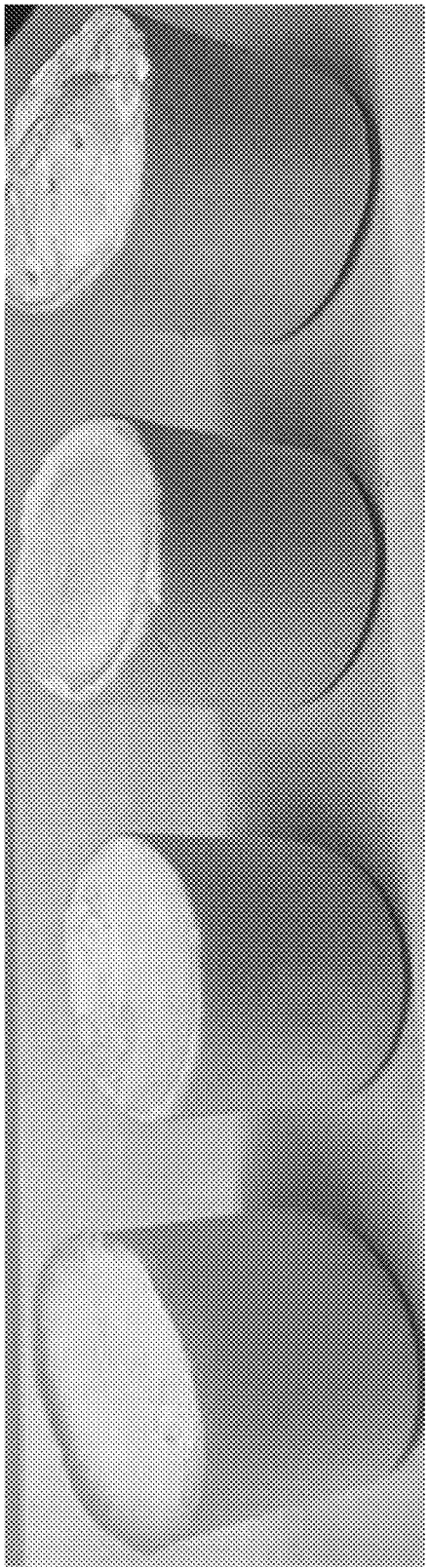
FIG. 16 demonstrates that exemplary foams can be prepared with different densities; from left to right: 0.01 g/cm$^3$ (NCC foam), 0.027 g/cm$^3$ (2NCC foam), 0.045 g/cm$^3$ (4NCC foam), 0.1 g/cm$^3$ (8NCC foam), with PVA, citric acid, and catalyst ($KH_2PO_4$).
Figure 17:
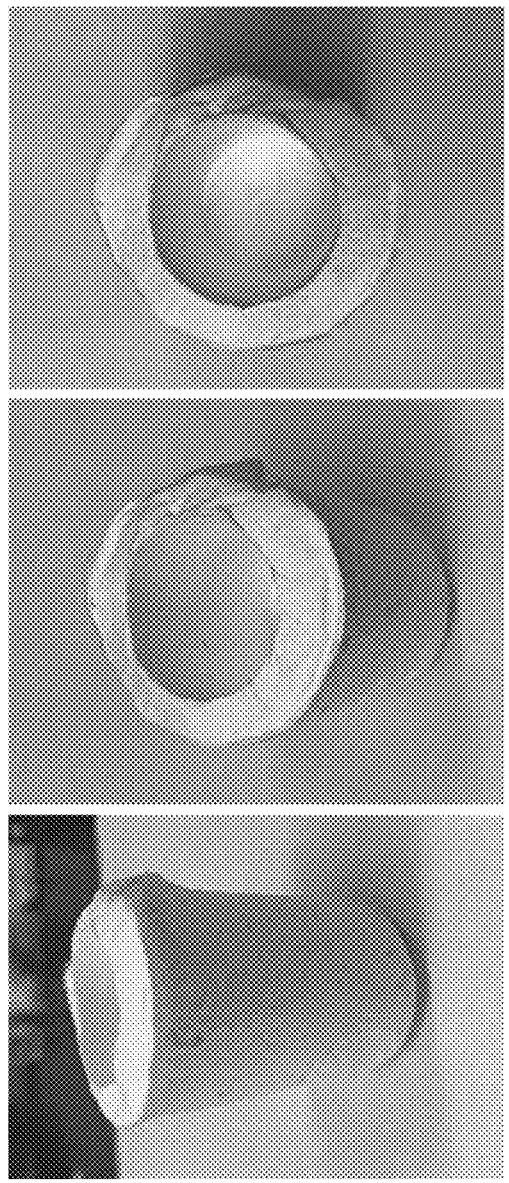
FIG. 17 demonstrates that the foams can be molded to any shape with good mechanical strength.
Figures 19A, 19B:
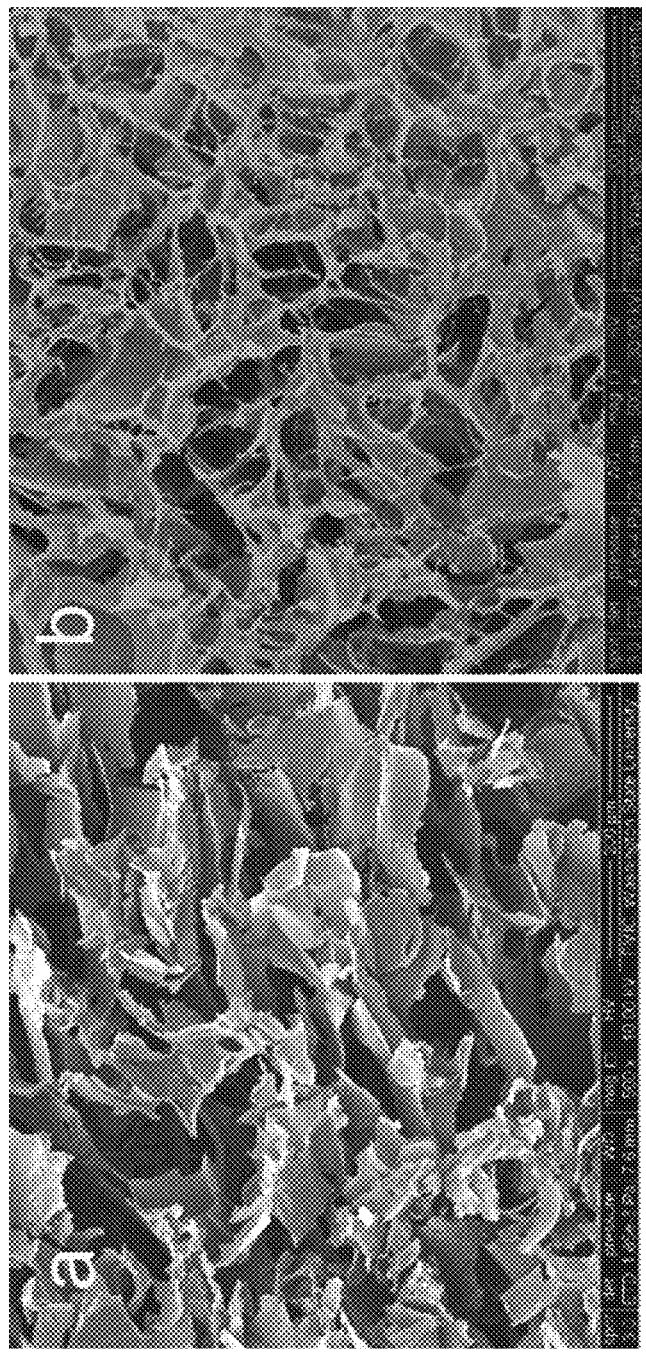
FIGS. 19A and 19B are SEM images of NCC foam pre-frozen at −20° C. (19A) and in liquid nitrogen (19B).
Figure 20A:
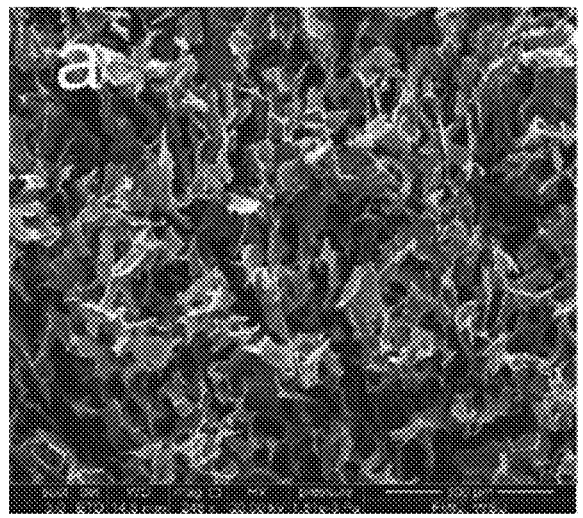
FIGS. 20A and 20B are SEM images of a silane agent-modified exemplary hydrophobic NCC foam (density of 0.027 g/cm$^3$).
Figure 20B:
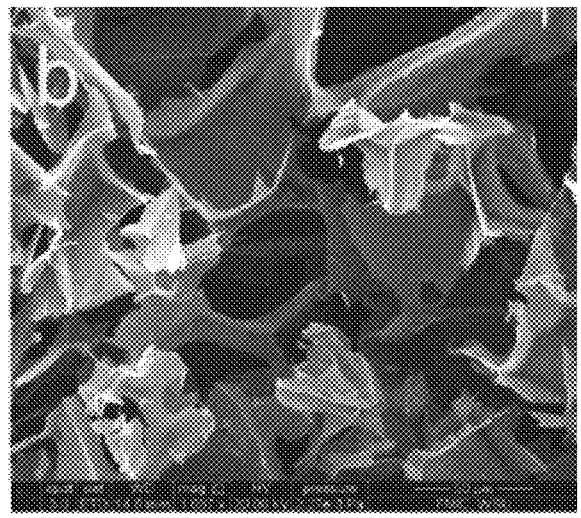
Figure 20C:
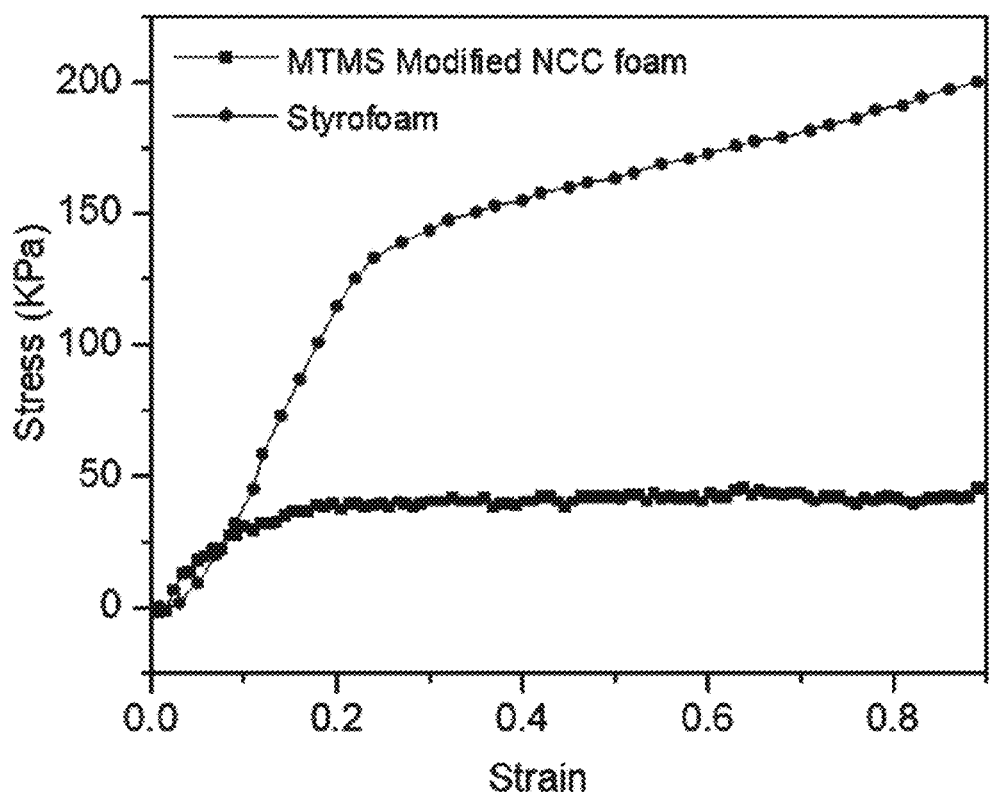
FIG. 20C is a graph of a compression test comparison of an exemplary hydrophobic (MTMS-treated) foam with Styrofoam.
Figure 21:
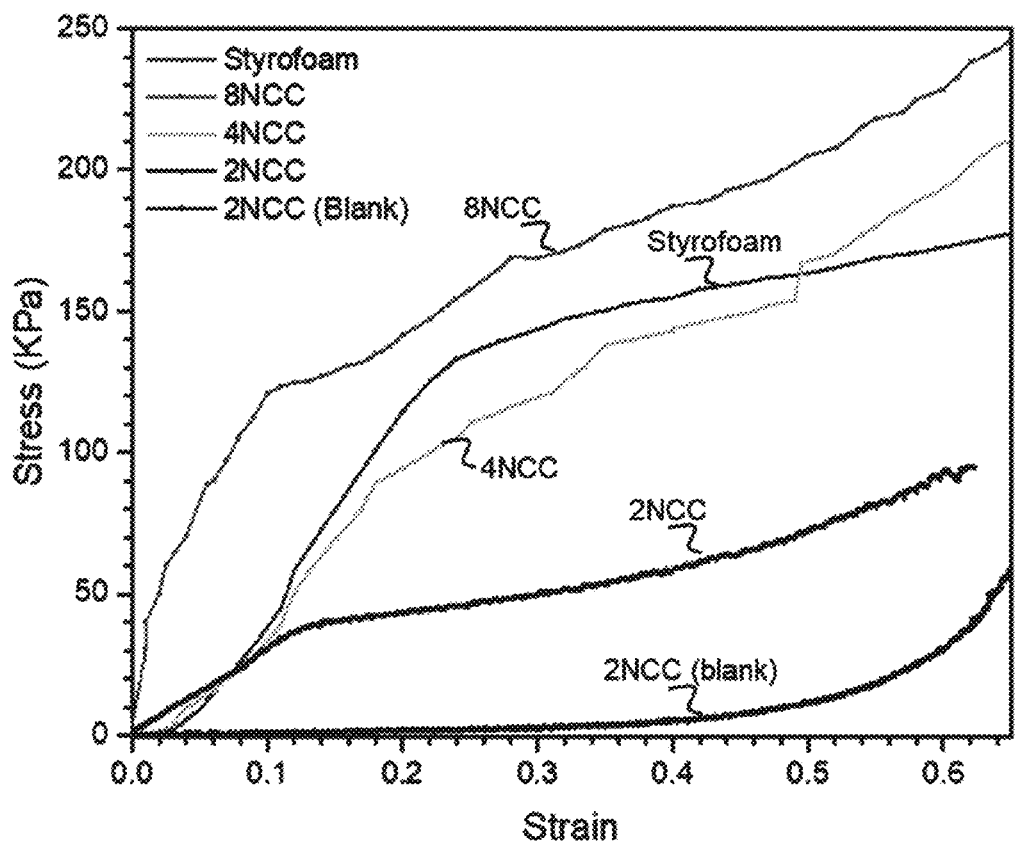
FIG. 21 shows stress-strain curves of Styrofoam and exemplary NCC composite foams with various densities (0.01 g/cm$^3$ (NCC foam), 0.027 g/cm$^3$ (2NCC foam), 0.045 g/cm$^3$ (4NCC foam), 0.1 g/cm$^3$ (8NCC foam)).
Figures 22A, 22B, 22C, 22D:
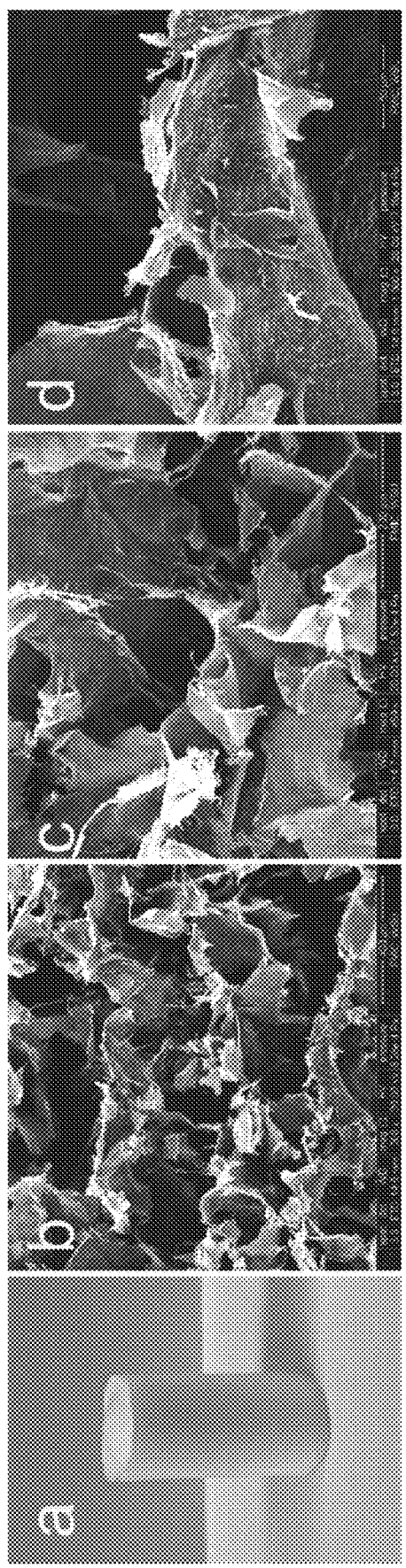
FIGS. 22A-22D are a photograph (22A) and SEM images (22B-D) of an exemplary foam 2NCC (NCC, PAA and PVA; wt % PVA:PAA=1:1).

In some embodiments, the composite foams of the disclosure are hydrophobic. Hydrophobization of the foams of the disclosure can be achieved in any suitable manner, for example, treating the foam or its precursor cellulose component with a silanizing agent (e.g., an alkoxysilane such as MTMS), as shown in FIG. 13. Thus, in some embodiments, at least a portion of the hydroxy groups of the cellulose component are silanized.

In another aspect, the disclosure provides a method of making a composite foam, comprising freeze-casting (or freeze-drying) an aqueous composition comprising about 0.01 wt % to about 40 wt. % of a foam precursor mixture. In some embodiments, the aqueous composition comprises about 0.01 wt % to about 30 wt. % of a foam precursor mixture. In some embodiments, the aqueous composition comprises about 0.01 wt % to about 25 wt. % of a foam precursor mixture. In some embodiments, the aqueous composition comprises about 0.01 wt % to about 20 wt. % of a foam precursor mixture. In some embodiments, the aqueous composition comprises about 0.01 wt % to about 15 wt. % of a foam precursor mixture. In some embodiments, the aqueous composition comprises about 0.01 wt % to about 10 wt. % of a foam precursor mixture. In some embodiments, the aqueous composition comprises about 0.01 wt % to about 5 wt. % of a foam precursor mixture. In some embodiments, the aqueous composition comprises about 0.1 wt % to about 30 wt. % of a foam precursor mixture.

In some embodiments, the foam precursor mixture comprises: about 40 wt % to about 95 wt % of a cellulose component comprising about 20% to about 100% cellulose nanomaterial; about 1 wt % to about 25 wt % of a water-soluble polymer comprising a plurality of first crosslinkable groups, about 1 wt % to about 25 wt % of a water-soluble crosslinking agent comprising a plurality of second crosslinkable groups; wherein at least a portion of the second crosslinkable groups can form covalent bonds with at least a portion of the first crosslinkable groups and at least a portion of the hydroxy groups of the cellulose component. In some embodiments, the aqueous composition is a suspension. In some embodiments, the aqueous composition does not include an organic solvent. In some embodiments, the composite foams of the disclosure are formed by freeze-casting or freeze-drying a precursor composition that does not comprise an organic solvent.

General processes for the preparation of the composite foams of the disclosure are illustrated in FIGS. 1 and 13. In some embodiments, to an aqueous composition comprising suitable amounts of a cellulose precursor and a polymer comprising a plurality of first crosslinkable groups, one or more crosslinking agents, such as those described above, can be added and the resulting mixture can be maintained at a suitable temperature for a time sufficient to form chemical linkages between the first crosslinkable groups and second crosslinkable groups and between the hydroxyl groups of the cellulose component and the second crosslinkable groups. Following the crosslinking reaction, freeze casting or freeze-drying can be applied to form the composite foam. A post-treatment can be applied to enhance the degree of crosslinking and further improve the properties of the final foam products. In some embodiments, the post treatment is a hydrophobization process such as silanization described above. The methods disclosed herein yield composite foams with high porosity and desirable mechanical properties, such as those described above.

The foams of the disclosure have a wide variety of applications. In an aspect, the disclosure provides an article of manufacture comprising a composite foam disclosed herein. In some embodiments, the article of manufacture is a construction material, such as an insulating panel. In some embodiments, the insulation panel comprises composite foam of the disclosure sandwiched between panels made from other materials. In some embodiments, the article of manufacture is a consumer product, such as a cup, a plate, a bowl, a shipping container, a cooler, or a potting container. In some embodiments, the article of manufacture is water-resistant or waterproof. Any product made of Styrofoam can be manufactured from the composite foams of the disclosure.

As used herein, the term "about" includes ±10% of the stated value.

While each of the elements of the present disclosure is described herein as containing multiple embodiments, it should be understood that, unless indicated otherwise, each of the embodiments of a given element of the present invention is capable of being used with each of the embodiments of the other elements of the present disclosure and each such use is intended to form a distinct embodiment of the present disclosure.

The referenced patents, patent applications, and scientific literature referred to herein are hereby incorporated by reference in their entirety as if each individual publication, patent or patent application were specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

As can be appreciated from the disclosure above, the present invention has a wide variety of applications. The invention is further illustrated by the following examples, which are only illustrative and are not intended to limit the definition and scope of the invention in any way.

EXAMPLES

A green method to prepare an environmentally friendly thermal insulation foam based on NCC is provided. Water is the only solvent used in this method without any excessive temperature or pressure. Polyvinyl alcohol (PVA), a water-soluble polymer with no toxic property is used in the formulation to increase the elastic properties of the composite foams. 1,2,3,4-butane tetracarboxylic acid (BTCA) is also introduced as a crosslinking agent to chemically bond NCC and PVA to obtain high strength. For the first time, provided are NCC-PVA foams that exhibit superior properties to those of previously reported nanocellulose-based foams in terms of the combination of required properties, i.e., thermal insulation, elasticity, and strength.

1.1. Materials

NCC was extracted from fully bleached hardwood kraft pulp by sulfuric acid treatment, following a previously established method (Dong, Revol, & Gray, 1998; Hamad & Hu, 2010). In brief, the pulp was first grounded by a Wiley mill and then passed through two mesh screens of 40 and 60. Those retained by the 60 mesh screen were collected and hydrolyzed using 64.5% w/w sulfuric acid at 45° C. for 25 min. Excessive deionized water was then added to quench hydrolysis reaction. The ensuing nanocrystalline cellulose suspension was transferred to a dialysis tubing and dialyzed against running distilled water for at least five days to remove the acid and soluble sugar. All other materials were used as received. Polyvinyl alcohol (PVA) with a molecular weight of $M_w$=85000-124000 and 99% hydrolyzed was purchased from Sigma Aldrich. The crosslinking agent used was 1,2,3,4-butane tetracarboxylic acid (BTCA), supplied by Acros Organics and dipotassium phosphate (DP) was purchased from Sigma Aldrich and used as a catalyst. Distilled water was used in all the experiments without further purification.

1.2. Preparation of NCC-Based Foams

NCC powder was dispersed in deionized water (2 g NCC per 98 ml of water) under sonication for 1 h. Polyvinyl alcohol (PVA) was then added to the NCC solution and heated at 90° C. for 2 h for PVA complete dissolution. The weight ratios tested for PVA:NCC were 0.00:1.00, 0.05:1.00, 0.10:1.00 and 0.20:1.00, described as pure NCC, 5PVA/NCC, 10PVA/NCC, and 20PVA/NCC, respectively. BTCA and DP were also added to 10PVA/NCC and 20PVA/NCC solutions to act as a crosslinking agent and catalyst, respectively (with a 2:1 w/w ratio of BTCA/DP) at two dosages of 10% and 25% of NCC weight. The final products were described as 10PVA/10BTCA/NCC, 10PVA/25BTCA/NCC, and 20PVA/10BTCA/NCC. 10PVA/25BTCA/NCC, for instance, was composed of 74 wt. % NCC, 7.5 wt. % PVA, and 18.5 wt. % BTCA/DP with respect to the total weight of the final composite. The mixture solutions were then placed in a polytetrafluoroethylene tube and kept in a freezer (−20° C.) for 6 h for complete water solidification. The frozen samples were transferred to the freeze dryer and freeze dried for 48 h to sublimize the water and obtain the foam. VirTis Lyo-Centre 3.5 L DBT ES-55 Benchtop Freeze Dryer was used at a controlled temperature of −50° C.

1.3. Fire Resistance and Carbonization

Vertical burning tests were done in an open-air environment following UL94. To further investigate the thermal stability and also assess the potential of these foams as precursors for carbon foams, carbonization was also conducted. The 10PVA/25BTCA/NCC foam was carbonized under a two-stage heating program with the protection of nitrogen. First, the sample temperature was raised to 500° C. at a heating rate of 2° C./min and it was kept for 2 h at the stabilized temperature. Then, it was heated up at a rate of 1° C./min to reach 800° C. and further carbonized at that temperature for 3 h. Samples were then taken out after cooling to room temperature inside the tube.

2. Characterization

Scanning electron microscopy (SEM) images were taken on an FEI SEM Quanta 200 F to investigate the cellular morphology and porosity of the foams. The samples were sputtered by gold and imaged at 10 kV. Fourier transform infrared spectroscopy (FTIR) was conducted on a NEXUS 670 spectrometer from 4000-400 $cm^{-1}$. Thermogravimetric analysis (TGA) was carried out on an SDT Q600 TG thermal analyser under air condition, heating from 25 to 800° C. at a heating rate of 10° C./min. The atomic force microscopy (AFM) was conducted on a Bruker MultiMode 8 AFM instrument, equipped with Silicon SPM-sensor. The data was obtained on non-contact/tapping mode, ScanAsyst® peak force tapping AFM probes, with resonance frequency of 190 kHz, and a force constant of 48 N/m. Very dilute NCC water solution was ultrasonicated and sprayed on a silicon wafer and dried before the AFM test. Thermal conductivity measurements were done using a ThermTest HotDisk TP-500 transient thermal analyzer. A 6 mm disk-shaped Kapton-wrapped sensor was sandwiched between the two halves of the samples. Certain electrical power and time were applied to obtain accurate thermal conductivity measurements. 6 to 10 replications were conducted for each sample and their average values and standard deviations are reported.

To determine the mechanical properties of NCC composite foams, a custom small-scale benchtop compression test apparatus was used. The displacement rate for all the tests was set at 0.01 mm/s. The top portion of the compression fixture had a moving frictionless flat surface and the bottom portion of the fixture was a stationary flat plate. Test samples were cylindrical with a height (38.1 mm) that was 1.5 times of the diameter (25.4 mm) to avoid buckling during the compression. At least five samples were tested for each condition and the average and standard deviation values are reported.

3. Results and Discussion

Figure 2:
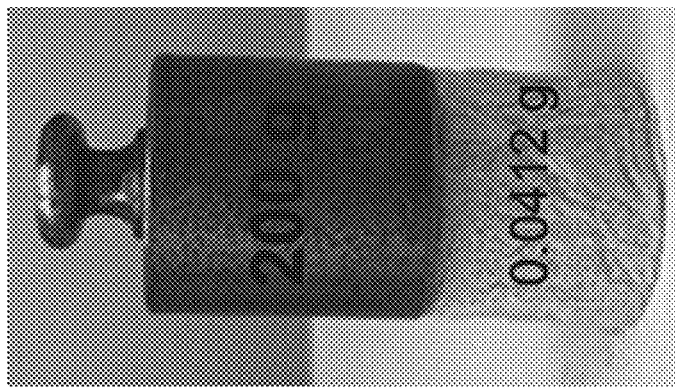
FIG. 2 shows a sample of an exemplary foam prepared from nanofiber derived from sawdust. The total weight of foam shown is 0.0412 gram with a density 0.02 g cm$^{-3}$.

The NCC powder was derived from the acid hydrolysis of natural biomass material, and the NCC aqueous solution exhibited a transparent appearance with a light blue color, indicating the good dispersion of the NCC in water. A highly lightweight, relatively strong, and super-insulative exemplary foam was obtained after adding PVA and BTCA cross-linking agent to NCC. The porosity, stress at 50% strain, and the thermal conductivity were measured to be 98.22%, 73 kPa, and 0.027 $Wm^{-1}K^{-1}$, respectively. Scanning electron microscopy showed a highly macro-porous nature of the composite foam with a relatively isotropic structure. Such a highly porous structure explains the lightweight and good thermal insulation performance of the foams. The exemplary foam (10PVA/25BTCA/NCC foam) showed excellent mechanical strength and could withstand a load of 100 g without any shape distortion for an extended period of time. The load was 200 times of the sample's weight. (FIG. 2) Pure NCC foam crashed immediately under this load. Fire resistance tests also revealed that the 10PVA/25BTCA/NCC foam did not produce any ash; it could maintain its overall structure with some volumetric shrinkage.

3.1. Morphology of Cellulose Nanocrystals and Resultant Foams

As determined by AFM images, NCC nanocrystals exhibited relatively uniform size and distribution, having around 20-40 nm width and 100-200 nm length, with a surface height ranging from 3-7 nm.

The NCC-based composite foams were in monolithic condition and exhibited macro-porous structure. To give a view of the structure and porosity, SEM was conducted. As the low magnification SEM micrograph of FIG. 18A shows, the pure NCC foam exhibited a sheet-like assembled structure with a high degree of disorder, where consistent and intact cell walls could not be developed (FIG. 18B). The other foams with different amount of PVA and BTCA loading showed similar morphology as that of pure NCC. However, 10PVA/25BTCA/NCC foams exhibited a well-organized structure with significantly smaller pores that are inter-connected through solid and consistent cell walls (FIGS. 18C and 18D). Based on the high-magnification SEM micrographs (FIG. 18D), an average pore size of 50-100 μm was estimated for the exemplary 10PVA/25BTCA/NCC composite foam. Compared to the pure NCC foam, the well-defined cell walls and pores with smaller sizes in the composite foam enhanced both the thermal insulation and the mechanical performance.

3.2. Density and Porosity of Foams

The apparent density of the foams, $\rho_{foam}$ is calculated based on Eq. (1) using the measured weight and volume of the foams. The mass was measured using a high precision analytical balance and the apparent volume was calculated by measuring the dimensions of the samples using a caliper. Average density values were calculated using at least five samples.

$$\rho_{foam} = \frac{m}{V} \quad (1)$$

The theoretical density of the bulk un-foamed composite, $\rho_{un\text{-}foamed}$ is obtained by the rule of mixture, Eq. (2), from the densities of components ($\rho_i$) and their weight fractions ($W_i$) using the following density values: NCC= 1.460 g·cm$^{-3}$, PVA=1.190 g·cm$^{-3}$, BTCA=1.674 g·cm$^{-3}$ and DP=2.440 g·cm$^{-3}$ (Svagan et al., 2008; Wicklein et al., 2015).

$$\rho_{un\text{-}foamed} = \frac{1}{\sum_{i=1}^{n}(W_i/\rho_i)} \quad (2)$$

Porosity was then measured using Eq. (3) (Wang et al., 2014;).

$$\text{Porosity } (\%) = \left(1 - \frac{\rho_{foam}}{\rho_{un\text{-}foamed}}\right) \times 100\%. \quad (3)$$

The apparent density of the NCC-based composite foams were measured to be in the range of 0.020-0.027 g·cm$^{-3}$, and the corresponding porosity values ranged from 98.6% to 98.1%, as listed in Table 1. The apparent density of the resultant foam can be tuned with the solvent and solute ratio during the mixing step. For the current study, 2 wt. % NCC was added to 98 wt. % water, which resulted in a final density of 0.020 g·cm$^{-3}$ for pure NCC foam. As seen in Table 1, the density continuously increased with an increase in the PVA and BTCA content. There is an increase of 30% in density when PVA content was increased from 0 to 20%, which corresponds to ~0.4% reduction in the porosity. The major reason for an increased density with the addition of PVA and BTCA is that the NCC mass in the solution was kept unchanged and as PVA and BTCA were added, the total mass was increased while the apparent volume was kept constant. This resulted in slightly greater density values for the composite foams. Therefore, smaller density values for composite foams can also be achieved by decreasing solute to solvent ratio during mixing.

TABLE 1

Density and porosity values of NCC composite foams.

| Composition | Apparent density of composite foam, g cm$^{-3}$ | Density of unfoamed composite foam, g cm$^{-3}$ | Porosity, % |
|---|---|---|---|
| NCC | 0.020 | 1.46 | 98.63 |
| 5PVA/NCC | 0.022 | 1.45 | 98.48 |
| 10PVA/NCC | 0.024 | 1.44 | 98.33 |
| 20PVA/NCC | 0.026 | 1.42 | 98.17 |
| 10PVA/10BTCA/NCC | 0.026 | 1.47 | 98.23 |
| 10PVA/25BTCA/NCC | 0.027 | 1.52 | 98.22 |
| 20PVA/10BTCA/NCC | 0.027 | 1.45 | 98.14 |

3.3. NCC, PVA and BTCA Interactions

The crosslinking procedure of NCC, PVA, and BTCA is shown in FIG. 3. BTCA contains four carboxyl acid groups and can esterify with various hydroxy groups (R—OH), as it has been used for cellulose crosslinking. With the presence of DP catalyst, anhydride was formed in the solution and facilitated the ester bond formation between the BTCA and the hydroxy groups of NCC. On the other hand, BTCA could also form ester bonds with the hydroxy groups of PVA. This means the BTCA could form chemical bonds with both NCC and PVA and acted as a strong chemical binder between them. The resultant foam behaved as an intact composite material wherein the characteristics of both NCC and PVA were reflected in the final properties. At the same time, intramolecular and intermolecular hydrogen bonds formed between hydroxy groups within and among PVA and NCC as shown in FIG. 3. The mechanical strength of the composite foams was thus further improved by the crosslinked hydrogen-bonded network structure.

Figure 5:
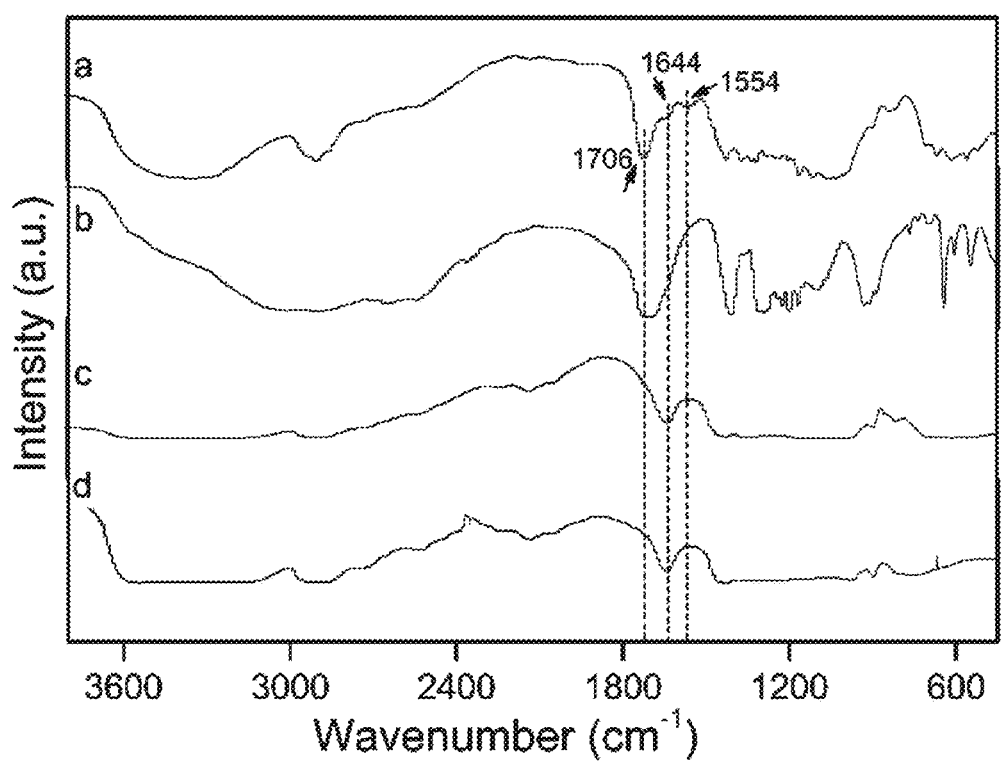
FIG. 5 shows IR spectra of nanocrystalline cellulose (NCC) and NCC-based composite foams: exemplary foam 10PVA/25BTCA/NCC (a), BTCA (b), 10PVA/NCC (c) and NCC (d).

Infrared spectra were used to investigate the interactions between PVA, NCC and BTCA at different material compositions. As shown in FIG. 5, the wide peak around 3500 $cm^{-1}$ of 10PVA/25BTCA/NCC composite foam corresponds to the hydroxyl bonds between PVA and NCC, and the adsorbed water on their surfaces. The absorption peak at 1644 $cm^{-1}$ is also attributed to C—O(H) stretching vibrations. The characteristic IR bond located at 1706 $cm^{-1}$ is associated with carboxyl groups. Compared to carboxyl group of BTCA, the composite foam showed a small sharp peak around 1554 $cm^{-1}$, confirming that the ester bond was formed.

3.4. Thermal Stability

Thermogravimetric measurement in air condition was applied to evaluate the thermal stability of the composite foams. Both pure NCC foam and 10PVA/25BTCA/NCC foam experienced an initial weight loss of ~6% when heated up to 100° C.; this is attributed to the water adsorbed on the surface. PVA had insignificant weight loss before 150° C. and started to decompose at ~200° C. BTCA showed a good thermal stability up to 170° C., beyond which started to decompose rapidly. The significant mass loss of 10PVA/25BTCA/NCC foam, associated with the degradation and decomposition was observed at ~250° C.; this temperature was about 200° C. for BTCA, 230° C. for PVA and 280° C. for pure NCC foam. These values indicate that the thermal decomposition temperature of pure NCC slightly decreases once BTCA and PVA are added. Since the decomposition temperature of PVA and NCC are similar, this decrease is associated with the lower decomposition temperature of BTCA. However, it is noted that this drop was less than 7% (~20° C.).

3.5. Mechanical Properties

Figure 6A:
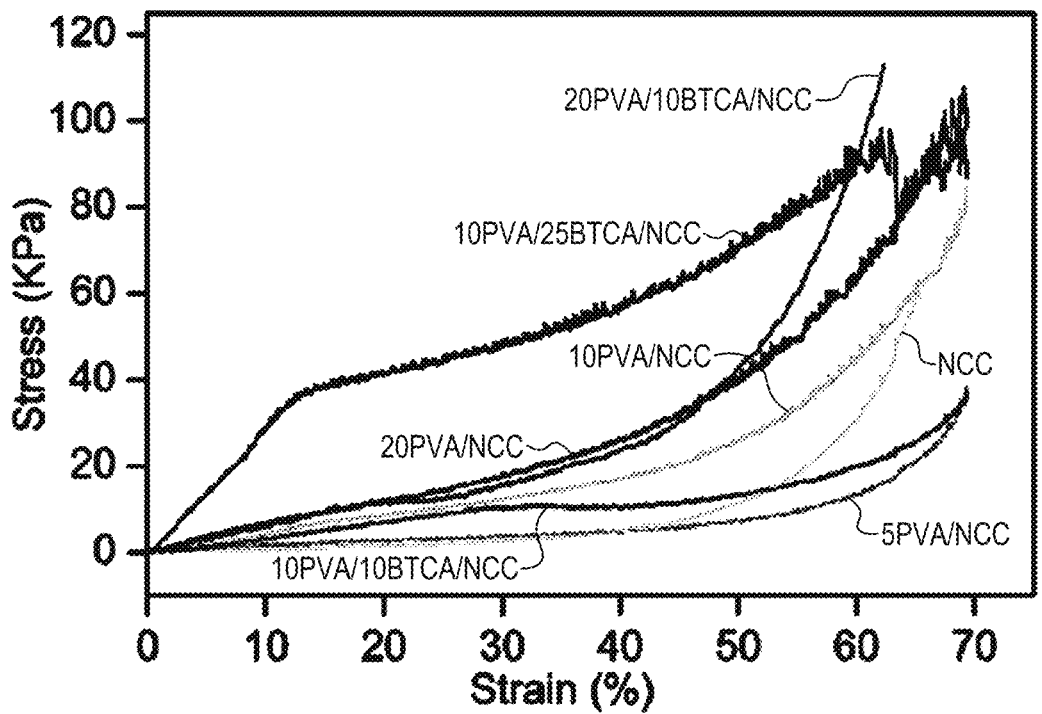
FIGS. 6A and 6B are stress-strain curves of NCC composite foams with various contents of PVA and BTCA.
Figure 6B:
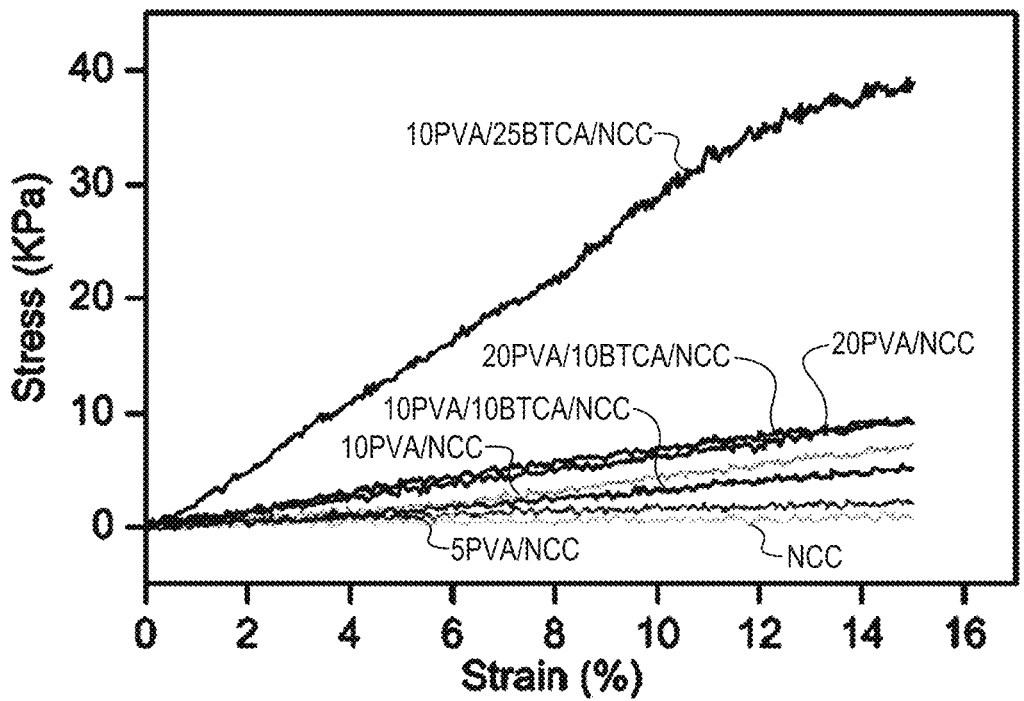

FIGS. 6A and 6B depict the compressive stress-strain curves for NCC composite foam samples with different formulations containing 0-20 wt. % PVA and 0-25 wt. % BTCA. Usually low-density foams exhibit three regions of stress-statin curve under compression loading, namely, elastic region, collapse region, and densification region. The pure NCC foam exhibited no elastic region. As the loading started, the collapse region is immediately observed, indicating that there was no measurable elastic behavior of pure NCC foam and the cell walls started to collapse, break, or buckle at the very early stages of the loading. Once the compaction reached to about 50% strain, the stress started to build up, which is due to the densification of the collapsed cell walls. This stress-strain behavior indicates that the pure NCC foam was very weak and even macroscopically collapsed at very delicate mechanical loads.

In PVA/NCC foams, once the PVA was introduced to the NCC structure, the stress-strain behavior was altered. Introducing 5 wt. % PVA did not cause a significant change in the overall behavior of NCC foam. However, the addition of 10 and 20 wt. % PVA to NCC created some load bearing capability, which was greater at 20 wt. % PVA. It is also interesting to note that the collapse region, i.e., the plateau region after elasticity, was minimized in the cases of 10PVA/NCC and 20PVA/NCC. The compaction region is almost connected to the elastic region, which indicates that the cell walls experienced more elastic deformation without significant buckling failure, before they become in contact with one another, where the compaction started, and the stress increased significantly. However, the strength values were still low (<10 kPa). The relatively low strength values indicate that the cellulose nanocrystals with high strength could not effectively participate in load bearing; this is attributed to the lack of strong bonding between elastic PVA phase and rigid NCC phase. To further enhance the strength of the foams, BTCA was introduced as the crosslinking agent between NCC and PVA. The addition of 10 wt. % BTCA to 10PVA/NCC and 20PVA/NCC did not cause a significant change in the mechanical behavior, especially at the early stages of the loading. It is believed that a sufficient degree of crosslinking could not form in these cases. However, when 25 wt. % BTCA was added to 10PVA/NCC formulation, the mechanical strength of the foams was significantly increased, reaching to a stress value of ~40 kPa in the elastic range at ~13% strains and a stress value of ~73 kPa at 50% strain. As also seen in FIG. 6B, the 10PVA/25BTCA/NCC composite foam exhibited a dramatically increased stiffness at the first stage of loading until 13% strain, under a linear stress-strain relationship. Once the loading entered the collapse region, the stress continued to rise as strain was increased, indicating that the failure of the cell walls under buckling occurred in a more gradual and ductile manner, as opposed to the sudden and brittle failure of the pure NCC foam. The elastic range, strength, and stiffness values achieved here are superior to those of previously reported nanocellulose-based foams.

Figure 7A:
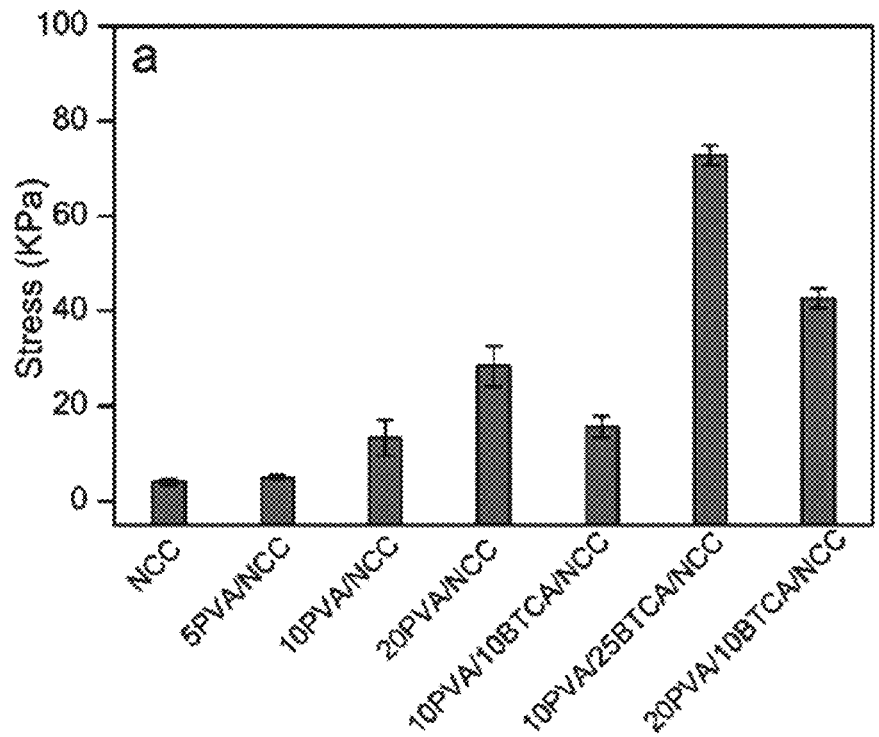
FIGS. 7A and 7B show stress at 50% strain values (7A), and modulus of elasticity (7B) of NCC composite foams with various contents of PVA and BTCA. Error bars show ±standard deviations.

As a measure of strength, FIG. 7A shows the stress at 50% strain for NCC composite foams. The pure NCC foam's stress was ~4 kPa, which continuously increased with an increase in the PVA content, reaching to 28 kPa at 20 wt. % PVA. In the pure NCC foam, there were no strong bonds between the individual nanocrystals as they have emerged from a completely dispersed cellulose solution, upon water solidification and removal. However, in the case of PVA/NCC composite foams, once PVA is completely dispersed together with the cellulose nanocrystals, upon the ice crystallization, the PVA molecules and the cellulose nanocrystals are simultaneously ejected from the crystallized $H_2O$ regions and locally precipitated with a uniform blend. As their local concentrations increases as a consequence of further ice crystallization, the PVA molecules form entangled chain structures, while they encapsulate the individual nanocrystals. This causes an effective physical binding action of PVA, where all nanocrystals are held together and thus the composite becomes stronger.

For 10PVA/25BTCA/NCC foam, the stress at 50% strain reached ~73 kPa, accounting for ~1820% increase in the strength of pure NCC foam. This huge enhancement is explained by the obtained 3-D chemically crosslinked networks of PVA and NCC with the aid of BTCA, as discussed earlier. In such a network, PVA provided the elasticity and ductility, while NCC contributed to the enhanced strength and stiffness. It is also noted that the macroscopic improvement in the cellular morphology is a consequence of stronger material during cell formation, which in turn, contributes to the enhanced mechanical performance.

Figure 7B:
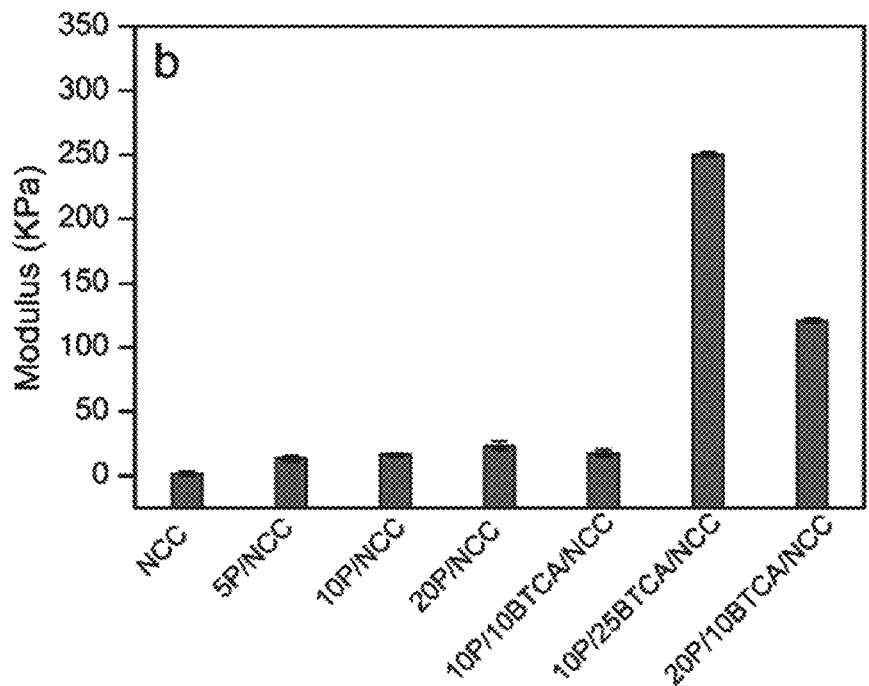

FIG. 7B shows the modulus of elasticity of the NCC composite foams. The modulus was calculated by fitting a line for a segment of stress-strain curves where the strain is less than 10%. As discussed earlier, pure NCC foams did not show any significant elasticity and therefore the modulus was barely registered for a strain of 10% at ~2 kPa. However, with the inclusion of PVA and BTCA to the foam structure, the modulus at 10% strain increased with an increase in the PVA content and reached to ~250 kPa for 10PVA/25BTCA/NCC, which is more than two orders of magnitude enhancement. Table 2 provides a comparison of the strength (stress at 50% strain) and modulus (at 10% strain) of the current foam with the data of the published works based on nanocellulose. As seen in the Table, our composite foam showed the best combination of the highest strength and the highest modulus. Both the strength and the modulus of the current foam are the highest when compared to the cellulose-based foams without any inorganic reinforcement. The performance is similar or better even when compared to the foams with reinforcing inorganic additives.

TABLE 2

Comparison of stress at 50% strain and modulus with published works.

| Work Title | Stress at 50% strain (kPa) | Modulus at 10% strain (kPa) | Reference |
|---|---|---|---|
| Thermally insulating and fire-retardant lightweight anisotropic foams based on nanocellulose and graphene oxide | ~22* | ~200* | Nature Nanotechnology, 2015, 10, 277-283 |
| Cellulose Nanocrystal Aerogels as Universal 3D Lightweight Substrates for Supercapacitor Materials | ~5* | ~10* | Advanced Materials, 2015, 27, 6104-6109 |
| Superior mechanical performance of highly porous, anisotropic nanocellulose-montmorillonite aerogels prepared by freeze casting | ~75 | ~200* | Journal of the Mechanical Behavior of Biomedical Materials, 2014, 37, 88-89 |
| Highly flexible cross-linked cellulose nanofibril sponge-like aerogels with improved mechanical property and enhanced flame retardancy | ~4 | ~10 | Carbohydrate Polymers 179 (2018) 333-340 |
| Composite foams of the disclosure | ~72 | ~250 | |

3.6. Thermal Insulation

Figure 8:
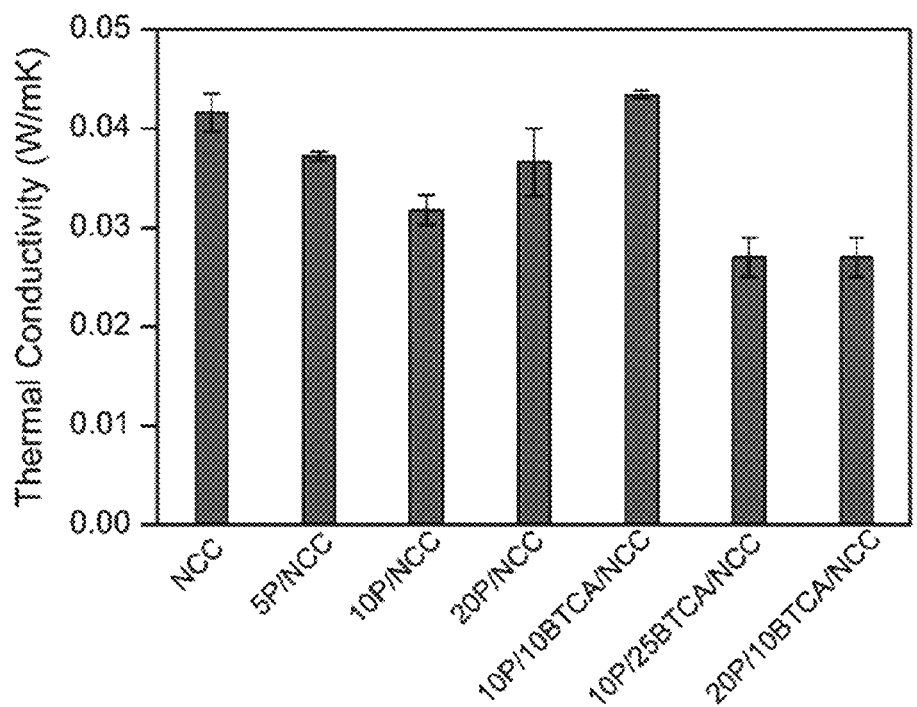
FIG. 8 shows thermal conductivity values of NCC composite foams with various contents of PVA and BTCA. Error bars show ±standard deviations.

Thermal conductivity is the most important parameter in the design and selection of materials for thermal insulation applications. The axial thermal conductivity of pure NCC and NCC composite foams are reported in FIG. 8 In PVA/NCC samples, the thermal conductivity appeared to be relatively insensitive to the PVA content and it ranged between 0.036 and 0.041 Wm$^{-1}$K$^{-1}$. However, the thermal conductivity was decreased for 10PVA/25BTCA/NCC composite foam with a value of 0.027 Wm$^{-1}$K$^{-1}$. This accounts for ~35% reduction in the thermal conductivity, compared to 0.041 Wm$^{-1}$K$^{-1}$ of pure NCC and a t-test analysis showed that the difference between the thermal conductivity of NCC and 10PVA/25BTCA/NCC samples are statistically significant with 99% confidence interval. In the case of NCC composite foams, more than 98% of the volume is made of air. In such low-density foams, the conduction by gaseous phase becomes one of the major heat transfer mechanisms. It is well established that, at a given relative density, a cellular structure with smaller cell sizes and higher cell density yields better thermal insulation capability. The smaller the cell sizes are, the more limited is the movement of gas molecules and thus less effective is the heat transfer through the gaseous phase. Therefore, the smallest cell sizes associated with 10PVA/25BTCA/NCC samples resulted in the lowest thermal conductivity. The thermal conductivity achieved here was below the range for common commercially available insulation materials, such as expanded polystyrene ($\lambda$=0.030-0.040 Wm$^{-1}$K$^{-1}$), mineral wool ($\lambda$=0.030-0.040 Wm$^{-1}$K$^{-1}$, and extruded polystyrene, $\lambda$=0.033-0.044 Wm$^{-1}$K$^{-1}$). It is also noted that the thermal insulation performance of cellulose based foams might be affected under hygrothermal exposure and further investigations are needed in this regard.

3.7. Fire Resistance and Carbonization

Figure 9:
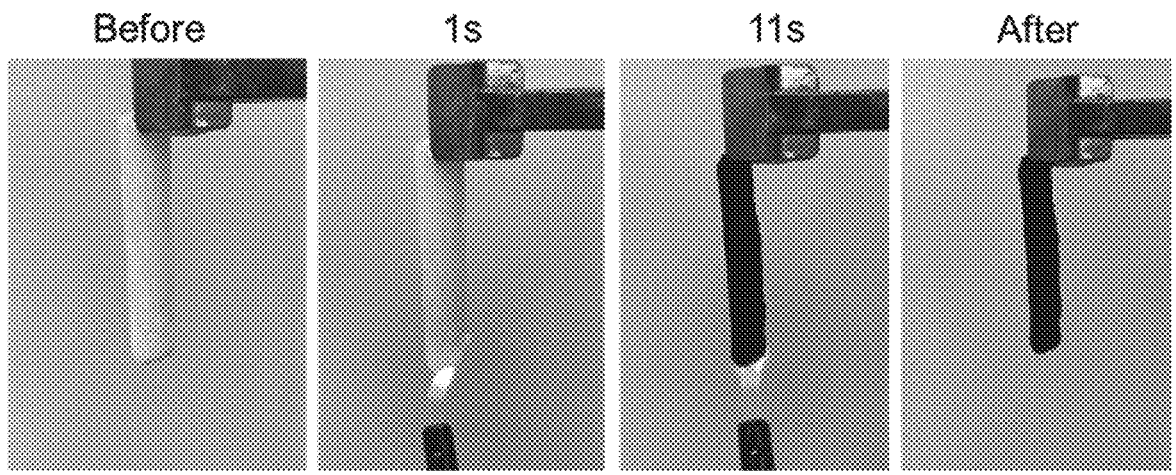
FIG. 9 depicts vertical burning test (UL94) of an exemplary foam (10P/25BTCA/NCC).

The 10PVA/25BTCA/NCC composite foam exhibited a fire resistance behavior with low shape distortion and small shrinkage after burning in an open atmospheric condition. The flammability was also further examined by vertical burning test (UL94) of 10PVA/25BTCA/NCC foam. FIG. 9 shows the 10P/25BTCA/NCC composite foam before and after 11 s burn, and the foam after the burning test, indicating that the composite foam maintained its structural integrity with a minimal shrinkage after burning. The burning rate of the NCC foam and the composite foam was similar. However, the structure of the pure NCC foam collapsed after burning testes. It is worth noting that the fire-retardant behavior of the composite foams can be further improved by adding inorganic retardant nanomaterials.

Figure 10A:
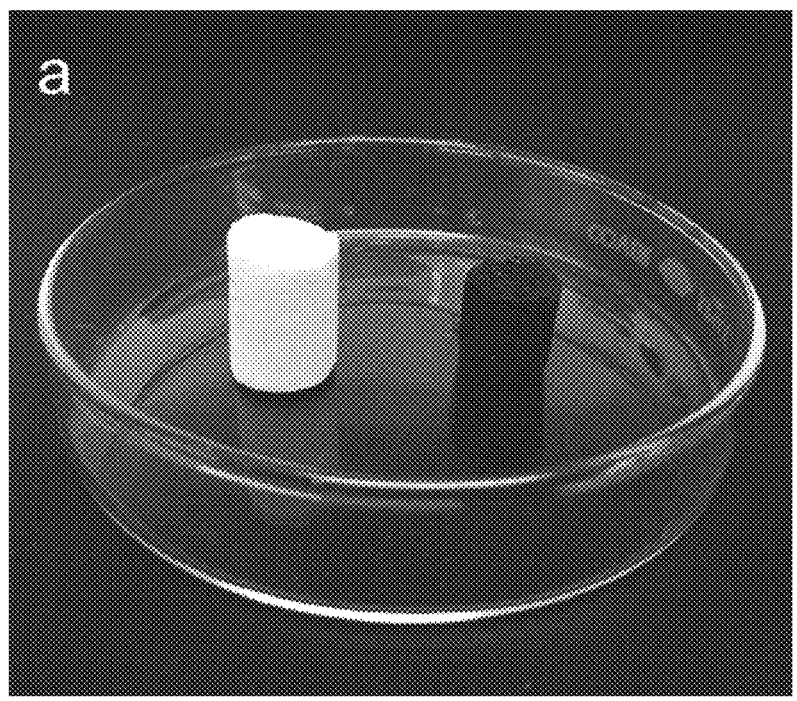
FIGS. 10A and 10B are photographs of an exemplary foam (10P/25BTCA/NCC) before and after carbonization under $N_2$ (10A) and SEM micrograph after carbonization (10B).
Figure 10B:
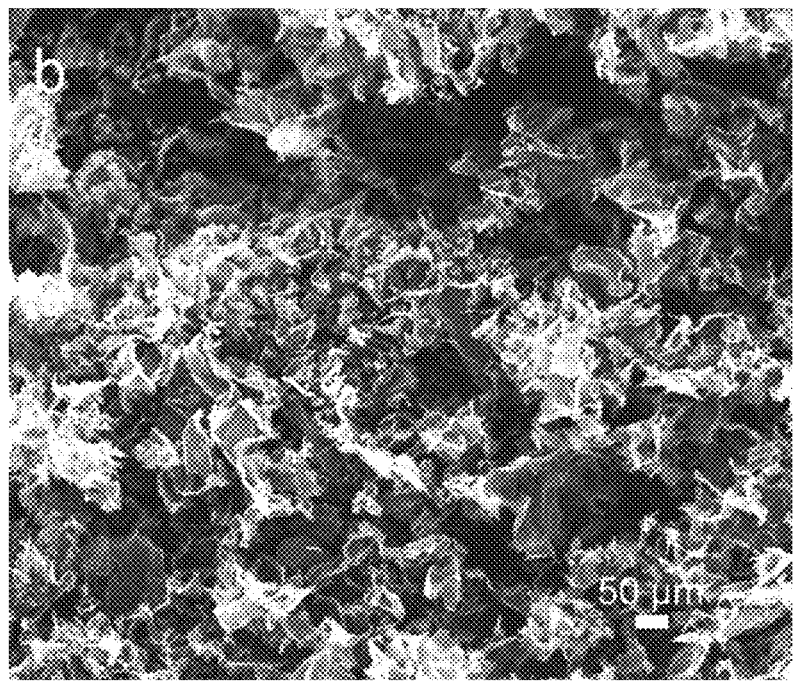

The 10PVA/25BTCA/NCC foam was also carbonized to evaluate its stability and thermal and mechanical properties after carbonization to assess its potential as a carbon foam precursor. As shown in FIG. 10A, the carbonized NCC composite foam shrank in both radial and axial directions, indicating its relatively isotropic cellular morphology. The carbonized composite foam maintained its original porous structure (FIG. 10B) but with some level of reduced uniformity compared to the original cellular structure. This might be related to the uneven local shrinkage of the structure during the carbonization process. The carbonized foam exhibited a relatively low density of 0.018 g·cm$^{-3}$ and a thermal conductivity of 0.065 Wm$^{-1}$K$^{-1}$. Based on the compression test, the carbonized NCC composite foam exhibited a linear elastic behavior at low strain levels, and the stress at 50% strain reached to 50 kPa, which is slightly lower than that for the foam sample before carbonization (73 kPa). These results show that the cellular structure was kept intact during carbonization process, indicating a promise of this NCC composite as a material for superlight carbon foams.

In summary, using a facile freeze-casting method, high-performance composite foams based on nanocrystalline cellulose (NCC) with an excellent combination of thermal insulation capability and mechanical properties were developed. An exemplary formulation of 74 wt. % NCC, 7.5 wt. % polyvinyl alcohol (PVA), and 18.5 wt. % BTCA/DP resulted in composite foams that exhibit an elastic strain of ~13% at a Young's modulus of 250 kPa and a stress value of 73 kPa at 50% strain; both exceed the values of reported nanocellulose-based foams without reinforcements. The foams exhibit a thermal conductivity of 0.027 $Wm^{-1}K^{-1}$, which is superior to those of traditional insulating materials.

Without wishing to be bound by theory, the chemical interaction between the cellulose nanocrystals and PVA molecules through ester bonds facilitated by the BTCA crosslinking agent was found responsible for the enhanced mechanical properties; the elasticity and rigidity were provided by PVA and NCC, respectively, in a crosslinked integrated NCC/PVA network. The enhanced elasticity and strength also contributed to having a more uniform cellular structure with smaller pore sizes during the ice crystallization stage, which in turn effectively reduced the thermal conductivity. While pure NCC foam burnt into ash, the exemplary composite foam maintained its overall structure with some shrinkage after burning.

The exemplary composite foams demonstrate the potential of renewable materials such as nanocellulose towards high-performance thermal insulation materials that can contribute to energy savings, less usage of petroleum-based materials, and reduction of adverse environmental impacts.

While illustrative embodiments have been illustrated and described, it will be appreciated that various changes can be made therein without departing from the spirit and scope of the invention.

We claim:

1. A composite foam, comprising:
   about 10 wt % to about 95 wt % of a cellulose component wherein said cellulose component is about 20 wt % to about 100 wt % cellulose nanomaterial;
   about 1 wt % to about 25 wt % of a water-soluble polymer comprising a plurality of first crosslinkable groups,
   about 1 wt % to about 25 wt % of a water-soluble crosslinking agent comprising a plurality of second crosslinkable groups;
   wherein at least a portion of the second crosslinkable groups are covalently bonded with at least a portion of the first crosslinkable groups and at least a portion of the hydroxy groups of the cellulose component; and
   wherein the composite foam has an apparent density of about 0.01 $g/cm^3$ to about 0.25 $g/cm^3$.

2. The composite foam of claim 1, wherein the composite foam has a porosity of about 30% to about 99%.

3. The composite foam of claim 1, wherein the cellulose component comprises 100 wt % cellulose nanomaterial.

4. The composite foam of claim 1, wherein the first crosslinkable group is a hydroxyl, a thiol, a hydrazide, an amino group, or a combination thereof.

5. The composite foam of claim 1, wherein the second crosslinkable group is a carboxylic acid, an anhydride, an activated ester, an aldehyde, a ketone, or a combination thereof.

6. The composite foam of claim 1, wherein water-soluble polymer is polyvinyl alcohol (PVA), polyethylene glycol (PEG), polyacrylic acid (PAA), polyvinyl pyrrolidone (PVP), polyacrylamide (PAM), alginic acid, starch, xanthan gum, dextran, pectin, or a combination thereof.

7. The composite foam of claim 1, wherein water-soluble crosslinking agent is 1,2,3,4-butane tetracarboxylic acid, oxalic acid, succinic acid, malic acid, citric acid, adipic acid, or a combination thereof.

8. The composite foam of claim 1, wherein the composite foam is formed by freeze-casting of a precursor composition that does not comprise an organic solvent.

9. The composite foam of claim 1, wherein the composite foam has a compression stress measured at 50% strain from about 50 kPa to about 250 kPa.

10. The composite foam of claim 1, wherein the composite foam has thermal conductivity from about 0.015 $Wm^{-1}K^{-1}$ to about 0.045 $Wm^{-1}K^{-1}$.

11. The composite foam of claim 1, wherein the composite foam has an elastic strain of at least 10% at Young's modulus of from 50 kPa to about 1500 kPa.

12. The composite foam of claim 1, wherein the composite foam comprises a colorant.

13. The composite foam of claim 1, wherein at least a portion of the hydroxy groups of the cellulose component are silanized.

14. A building product or a consumer product comprising the composite foam of claim 1.

15. The building product of claim 14, wherein the building product is an insulation panel.

16. The consumer product of claim 14, wherein the consumer product is a cup, a plate, a shipping container, a cooler, or a potting container.

17. A method of making a composite foam, comprising freeze-casting or freeze-drying an aqueous composition comprising a foam precursor, wherein the foam precursor comprises:
   about 10 wt % to about 95 wt % of a cellulose component wherein said cellulose component is about 20 wt % to about 100 wt % cellulose nanomaterial;
   about 1 wt % to about 25 wt % of a water-soluble polymer comprising a plurality of first crosslinkable groups,
   about 1 wt % to about 25 wt % of a water-soluble crosslinking agent comprising a plurality of second crosslinkable groups;
   wherein at least a portion of the second crosslinkable groups can form covalent bonds with at least a portion of the first crosslinkable groups and at least a portion of the hydroxy groups of the cellulose component; and
   wherein the composite foam has an apparent density of about 0.01 $g/cm^3$ to about 0.25 $g/cm^3$.

18. The method of claim 17, wherein the aqueous composition does not include an organic solvent.

19. A composite foam prepared by a method of making a composite foam, comprising freeze-casting or freeze-drying an aqueous composition comprising a foam precursor, wherein the foam precursor comprises:
   about 10 wt % to about 95 wt % of a cellulose component wherein said cellulose component is about 20 wt % to about 100 wt % cellulose nanomaterial;
   about 1 wt % to about 25 wt % of a water-soluble polymer comprising a plurality of first crosslinkable groups; and
   about 1 wt % to about 25 wt % of a water-soluble crosslinking agent comprising a plurality of second crosslinkable groups;
   wherein at least a portion of the second crosslinkable groups can form covalent bonds with at least a portion of the first crosslinkable groups and at least a portion of the hydroxy groups of the cellulose component; and
   wherein the composite foam has an apparent density of about 0.01 $g/cm^3$ to about 0.25 $g/cm^3$.

\* \* \* \* \*